(12) United States Patent
Das Sharma et al.

(10) Patent No.: US 12,481,614 B2
(45) Date of Patent: Nov. 25, 2025

(54) STANDARD INTERFACES FOR DIE TO DIE (D2D) INTERCONNECT STACKS

(71) Applicant: Intel Corporation, Santa Clara, CA (US)

(72) Inventors: Debendra Das Sharma, Saratoga, CA (US); Swadesh Choudhary, Mountain View, CA (US); Narasimha Lanka, Dublin, CA (US); Zuoguo Wu, San Jose, CA (US); Gerald Pasdast, San Jose, CA (US); Lakshmipriya Seshan, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 482 days.

(21) Appl. No.: 17/844,366

(22) Filed: Jun. 20, 2022

(65) Prior Publication Data
US 2022/0327083 A1   Oct. 13, 2022

Related U.S. Application Data

(60) Provisional application No. 63/295,144, filed on Dec. 30, 2021.

(51) Int. Cl.
*G06F 3/06* (2006.01)
*G06F 1/3234* (2019.01)
(Continued)

(52) U.S. Cl.
CPC ...... *G06F 13/4221* (2013.01); *G06F 13/4031* (2013.01); *H01L 23/5381* (2013.01);
(Continued)

(58) Field of Classification Search
CPC ............. G06F 13/4221; G06F 13/4031; H01L 23/5381; H01L 23/5385; H01L 23/5386;
(Continued)

(56) References Cited

U.S. PATENT DOCUMENTS

| 7,936,779 B2 | 5/2011 | Risberg et al. |
| 8,782,321 B2 | 7/2014 | Harriman et al. |

(Continued)

FOREIGN PATENT DOCUMENTS

| CN | 105765544 | 4/2019 |
| EP | 2390969 | 11/2011 |

(Continued)

OTHER PUBLICATIONS

Dr. Debendra Das Sharma, Universal Chiplet Interconnect Express (UCIe)®: Building an open chiplet ecosystem, Property of Universal Chiplet Interconnect Express (UCIe) 2022, 7 pgs.
(Continued)

*Primary Examiner* — Christopher B Shin
(74) *Attorney, Agent, or Firm* — Eversheds Sutherland (US) LLP

(57) ABSTRACT

In one embodiment, a first die comprises: a first die-to-die adapter to communicate with first protocol layer circuitry via a flit-aware die-to-die interface (FDI) and first physical layer circuitry via a raw die-to-die interface (RDI), where the first die-to-die adapter is to receive message information comprising first information of a first interconnect protocol; and the first physical layer circuitry coupled to the first die-to-die adapter. The first physical layer circuitry may be configured to receive and output the first information to a second die via an interconnect, the first physical layer circuitry comprising a plurality of modules, each of the plurality of modules comprising an analog front end having transmitter circuitry and receiver circuitry. Other embodiments are described and claimed.

20 Claims, 19 Drawing Sheets

(51) Int. Cl.
    *G06F 1/3296* (2019.01)
    *G06F 13/40* (2006.01)
    *G06F 13/42* (2006.01)
    *H01L 23/538* (2006.01)
    *H01L 23/00* (2006.01)
    *H01L 25/065* (2023.01)

(52) U.S. Cl.
    CPC ...... *H01L 23/5385* (2013.01); *H01L 23/5386* (2013.01); *H01L 24/16* (2013.01); *H01L 25/0655* (2013.01); *H01L 2224/16225* (2013.01); *H01L 2924/1431* (2013.01); *H01L 2924/1432* (2013.01); *H01L 2924/14335* (2013.01); *H01L 2924/1434* (2013.01)

(58) Field of Classification Search
    CPC .............. H01L 24/16; H01L 25/0655; H01L 2224/16225; H01L 2924/16225; H01L 2924/1431; H01L 2924/1432; H01L 2924/14335; H01L 2924/1434
    USPC ......................................................... 710/313
    See application file for complete search history.

(56) References Cited

U.S. PATENT DOCUMENTS

| | | | |
|---|---|---|---|
| 8,856,420 | B2 | 10/2014 | Chandra et al. |
| 8,953,644 | B2 | 2/2015 | Chandra et al. |
| 9,164,535 | B2 | 10/2015 | Chandra et al. |
| 9,772,970 | B2 | 9/2017 | Luo et al. |
| 9,785,556 | B2 | 10/2017 | Sundararaman et al. |
| 9,804,989 | B2 | 10/2017 | Klein |
| 10,606,785 | B2 | 3/2020 | Das Sharma et al. |
| 10,614,000 | B2 | 4/2020 | Agarwal et al. |
| 10,698,842 | B1 | 6/2020 | Dastidar et al. |
| 10,817,462 | B1 | 10/2020 | Dastidar et al. |
| 10,848,595 | B2 | 11/2020 | Song et al. |
| 11,030,126 | B2 | 6/2021 | Koufaty et al. |
| 11,036,650 | B2 | 6/2021 | Agarwal |
| 11,194,505 | B2 | 12/2021 | Lee et al. |
| 11,201,838 | B2 | 12/2021 | Marolia et al. |
| 11,232,058 | B2 | 1/2022 | Jen et al. |
| 2011/0179212 | A1 | 7/2011 | Hartman |
| 2013/0262948 | A1 | 10/2013 | Takehara |
| 2014/0114928 | A1 | 4/2014 | Beers |
| 2014/0372663 | A1 | 12/2014 | Chandra et al. |
| 2015/0032917 | A1 | 1/2015 | Nguyen |
| 2015/0089110 | A1 | 3/2015 | Harriman et al. |
| 2018/0025789 | A1 | 1/2018 | Dono et al. |
| 2018/0109446 | A1 | 4/2018 | Srinivasan et al. |
| 2018/0300275 | A1 | 10/2018 | Wu et al. |
| 2019/0004990 | A1 | 1/2019 | Van Doren et al. |
| 2019/0095215 | A1 | 3/2019 | Teoh et al. |
| 2020/0042471 | A1 | 2/2020 | Kerr et al. |
| 2020/0044895 | A1 | 2/2020 | Mittal et al. |
| 2020/0278733 | A1 | 9/2020 | Li et al. |
| 2020/0356436 | A1 | 11/2020 | Iyer et al. |
| 2020/0394148 | A1 | 12/2020 | Regan et al. |
| 2020/0394150 | A1* | 12/2020 | Lanka ................ G06F 13/4226 |
| 2021/0097015 | A1 | 4/2021 | Das Sharma et al. |
| 2021/0224156 | A1 | 7/2021 | Cho et al. |
| 2021/0232520 | A1* | 7/2021 | Choudhary ......... G06F 13/4018 |
| 2021/0399982 | A1* | 12/2021 | Das Sharma ........... H04L 49/60 |
| 2022/0222198 | A1 | 7/2022 | Lanka et al. |
| 2022/0237138 | A1 | 7/2022 | Lanka et al. |
| 2022/0318111 | A1 | 10/2022 | Choudhary et al. |
| 2022/0327083 | A1 | 10/2022 | Das Sharma et al. |
| 2022/0327276 | A1 | 10/2022 | Seshan et al. |
| 2022/0350689 | A1* | 11/2022 | Curtokar ............. G06F 11/0769 |
| 2022/0350769 | A1* | 11/2022 | Hor ..................... G06F 13/1652 |
| 2024/0160585 | A1* | 5/2024 | Sharma ................ G06F 13/385 |

FOREIGN PATENT DOCUMENTS

| | | |
|---|---|---|
| EP | 3037972 | 6/2016 |
| WO | 2015099719 | 7/2015 |
| WO | 2019009970 | 1/2019 |

OTHER PUBLICATIONS

Universal Chiplet Interconnect Express (UCIe), Universal Chiplet Interconnect Express (UCIe) Specification Revision 1.0, Feb. 24, 2022, 288 pgs.

U.S. Appl. No. 17/844,348, filed Jun. 20, 2022, entitled "Compliance and Debug Methods for Die-To-Die (D2D) Interconnects," by Debendra Das Sharma, et al., 43 pgs.

U.S. Appl. No. 17/844,356, filed Jun. 20, 2022 entitled "Lane Repair and Lane Reversal Implementation for Die-To-Die (D2D) Interconnects," by Lakshmipriya Seshan, et al., 51 pgs.

U.S. Appl. No. 17/708,367, filed Mar. 30, 2022, entitled "Sideband Interface for Die-To-Die Interconnects," by Narasimha Lanka, et al., 49 pgs.

U.S. Appl. No. 17/708,386, filed Mar. 30, 2022, entitled "Link Initialization Training and Bring up for Die-To-Die Interconnect," by Narasimha Lanka, et al., 46 pgs.

International Searching Authority, International Search Report and Written Opinion dated Mar. 13, 2023 In International Application No. PCT/US2022/049772 (12 pages).

International Searching Authority, International Search Report and Written Opinion dated Apr. 4, 2023 in International Application No. PCT/US2022/050653 (13 pages).

International Searching Authority, International Search Report and Written Opinion dated Apr. 5, 2023 in International Application No. PCT/US2022/050656 (13 pages).

International Searching Authority, International Search Report and Written Opinion dated Apr. 7, 2023 in International Application No. PCT/US2022/050657 (11 pages).

International Searching Authority, International Search Report and Written Opinion dated Apr. 14, 2023 in International Application No. PCT/US2022/050655 (11 pages).

\* cited by examiner

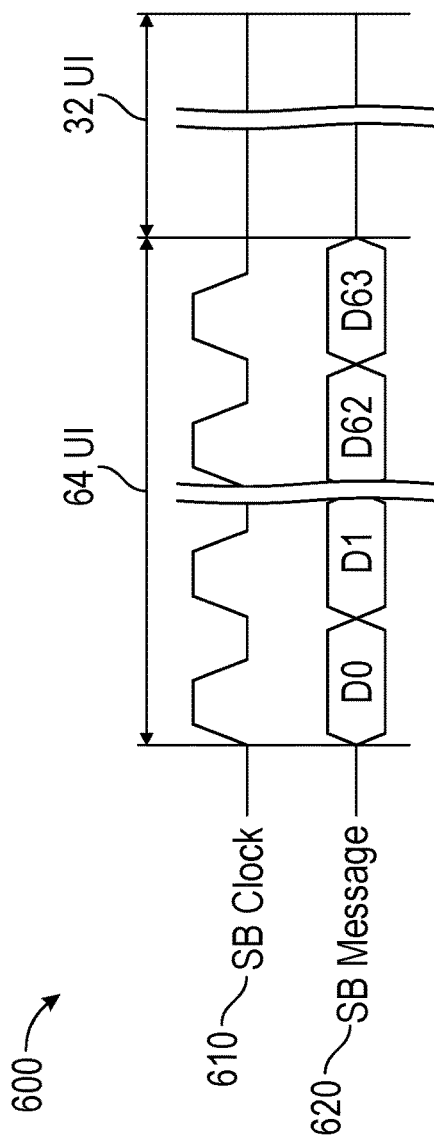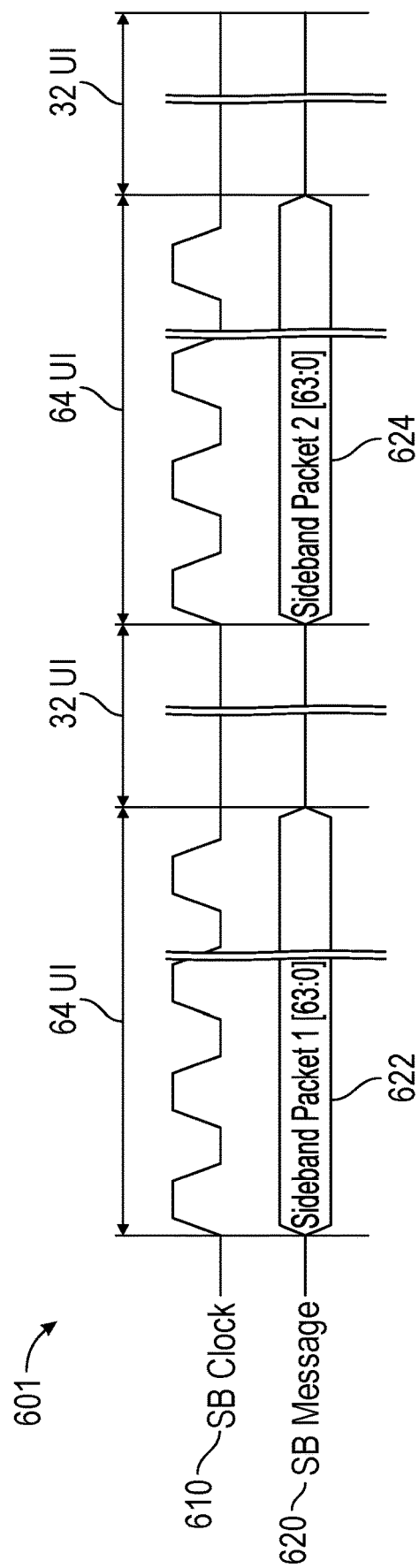
FIG. 6A
FIG. 6B

STANDARD INTERFACES FOR DIE TO DIE (D2D) INTERCONNECT STACKS

CROSS-REFERENCE TO RELATED APPLICATION

This application claims the benefit of U.S. Provisional Application No. 63/295,144, filed on Dec. 30, 2021, in the name of Debendra Das Sharma, Swadesh Choudhary, Narasimha Lanka, Zuoguo Wu, Gerald Pasdast and Lakshmipriya Seshan, entitled "STANDARD INTERFACES FOR DIE TO DIE (D2D) INTERCONNECT STACKS."

BACKGROUND

Legacy die-to-die (D2D) interconnects may be either vendor specific or application specific (e.g., high-bandwidth memory (HBM) may be used to connect memory on-package). There are some legacy D2D interconnects (e.g., advanced interface bus (AIB), high-bandwidth interconnect (HBI), bundle of wires (BoW), etc.) that may only define a physical layer, but may not provide a mechanism for ensuring interoperability across dies. Legacy packages are typically not be equipped with a general purpose D2D interconnect mapping ubiquitous load-store input/output (I/O) protocols that may be used for seamless interoperability between dies and that may provide open innovation slots on the package for the industry to innovate.

BRIEF DESCRIPTION OF THE DRAWINGS

FIGS. 6A/6B are timing diagrams illustrating sideband signaling in accordance with an embodiment.

DETAILED DESCRIPTION

Figure 1:
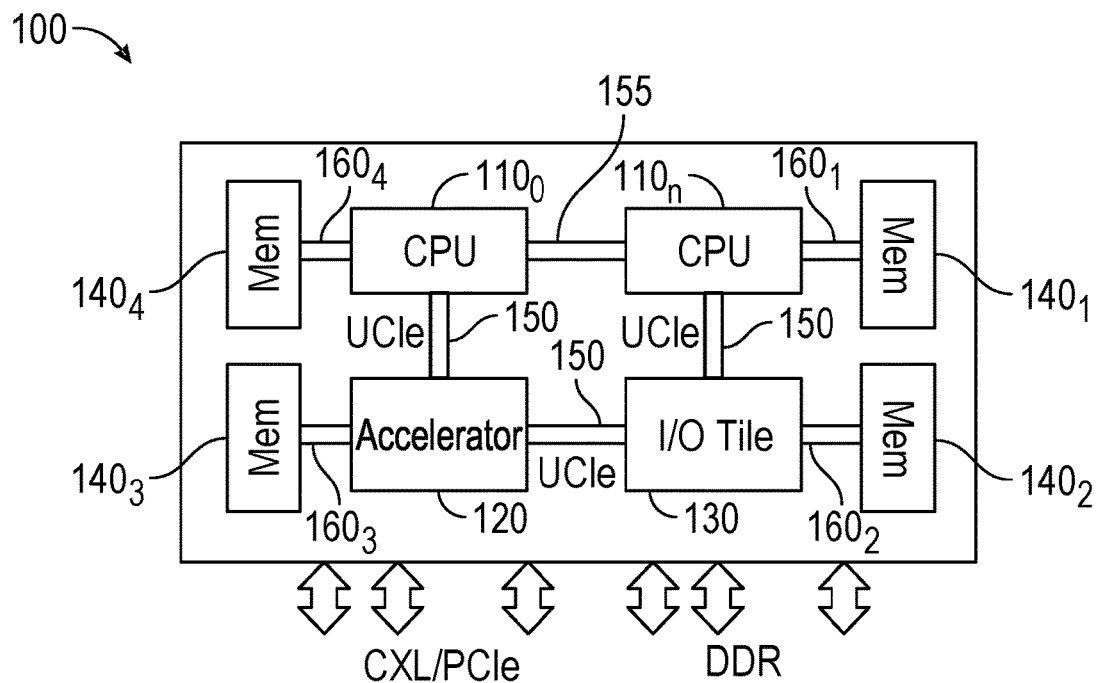
FIG. 1 is a block diagram of a package in accordance with an embodiment.

In various embodiments, a general purpose D2D interconnect may be configured to map ubiquitous load-store input/output (I/O) protocols such as Peripheral Component Interconnect express (PCIe) and Compute Express Link (CXL) that may be used for seamless interoperability between dies and that may provide open innovation slots on the package for the industry to innovate. Embodiments herein relate to such an interface, which may be referred to as Universal Chiplet Interconnect express (UCIe), although other names for such technology may exist or may be used in other embodiments.

One of the goals of standardization of such an interface is to enable a vibrant ecosystem of intellectual property (IP) providers for D2D silicon design. As a result, embodiments herein may relate to an interface definition along with the layered functional partitioning between the different blocks of a layered stack.

Embodiments herein may include or relate to a number of aspects. One such aspect is the interface between a D2D adapter and a physical layer, which may be referred to as a raw D2D interface (RDI). Another such aspect is the interface between a protocol layer and the D2D adapter, which may be referred to as a flit aware D2D interface (FDI). In some embodiments, the RDI may be derived from the FDI, and use similar rules for elements such as clock gating and sideband. Generally, the RDI and FDI may be considered to be related to, or a subset of, the logical PHY interface (LPIF) 2.0 specifications, and therefore embodiments herein may include or relate to extensions to the LPIF 2.0 specification for D2D applications.

Embodiments herein may include a number of advantages. One such advantage is that embodiments may allow vendors and system-on-chip (SoC) builders to easily mix and match different layers from different providers at low integration cost and faster time to market. (for example, getting a protocol layer to work with the D2D adapter and physical layer from any different vendor that conforms to the interface handshakes provided in this specification). Additionally, given that interoperability testing during post-silicon may have greater overhead and cost associated with it, a consistent understanding and development of Bus Functional Models (BFMs) may allow easier IP development for this stack. Additionally, because FDI may be related to or be a subset of LPIF 2.0, the same protocol layer may work with other LPIF 2.0 compliant implementations with relatively few changes.

Embodiments may be implemented in connection with a multi-protocol capable, on-package interconnect protocol that may be used to connect multiple chiplets or dies on a single package. With this interconnect protocol, a vibrant ecosystem of disaggregated die architectures can be interconnected together. This on-package interconnect protocol may be referred to as a "Universal Chiplet Interconnect express" (UCIe) interconnect protocol, which may be in accordance with a UCIe specification as may be issued by a special interest group (SIG) or other promotor, or other entity. While termed herein as "UCIe," understand that the multi-protocol capable, on-package interconnect protocol may adopt another nomenclature.

This UCIe interconnect protocol may support multiple underlying interconnect protocols, including flit-based modes of certain communication protocols. In one or more embodiments, the UCIe interconnect protocol may support: a flit mode of a Compute Express Limited (CXL) protocol such as in accordance with a given version of a CXL specification such as the CXL Specification version 2.0 (published November 2020), any future update, version or variation thereof; a Peripheral Component Interconnect express (PCIe) flit mode such as in accordance with a given version of a PCIe specification such as the PCIe Base Specification version 6.0 (published 2022) or any future update, version or variation thereof; and a raw (or streaming) mode that be used to map any protocol supported by link partners. Note that in one or more embodiments, the UCIe interconnect protocol may not be backwards-compatible, and instead may accommodate current and future versions of the above-described protocols or other protocols that support flit modes of communication.

Embodiments may be used to provide compute, memory, storage, and connectivity across an entire compute continuum, spanning cloud, edge, enterprise, 5G, automotive, high-performance computing, and hand-held segments. Embodiments may be used to package or otherwise couple dies from different sources, including different fabs, different designs, and different packaging technologies.

Chiplet integration on package also enables a customer to make different trade-offs for different market segments by choosing different numbers and types of dies. For example, one can choose different numbers of compute, memory, and I/O dies depending on segment. As such, there is no need for a different die design for different segments, resulting in lower product stock keeping unit (SKU) costs.

Referring now to FIG. 1, shown is a block diagram of a package in accordance with an embodiment. As shown in FIG. 1, package 100 may be any type of integrated circuit package. In the particular illustration shown, package 100 includes multiple chiplets or dies, including central processing unit (CPU) dies $110_{0-n}$, an accelerator die 120, an input/output (I/O) tile 130, and memory $140_{1-4}$. At least certain of these dies may be coupled together via on-package interconnects in accordance with an embodiment. As shown, interconnects $150_{1-3}$ may be implemented as UCIe interconnects. CPUs 110 may couple via another on-package interconnect 155 which, in some cases, may provide CPU-to-CPU connectivity on-package using a UCIe interconnect that runs a coherency protocol. As one such example, this coherency protocol may be an Intel® Ultra Path Interconnect (UPI); of course other examples are possible.

While the protocols mapped to the UCIe protocol discussed herein include PCIe and CXL, understand embodiments are not limited in this regard. In example embodiments, mappings for any underlying protocols may be done using a flit format, including the raw mode. In an implementation, these protocol mappings may enable more on-package integration by replacing certain physical layer circuitry (e.g., a PCIe SERDES PHY and PCIe/CXL LogPHY along with link level retry) with a UCIe die-to-die adapter and PHY in accordance with an embodiment to improve power and performance characteristics. In addition, the raw mode may be protocol-agnostic to enable other protocols to be mapped, while allowing usages such as integrating a stand-alone SERDES/transceiver tile (e.g., ethernet) on-package. As further shown in FIG. 1, off-package interconnects may be in accordance with various protocols, including CXL/PCIe protocols, double data rate (DDR) memory interconnect protocols and so forth.

In an example implementation, accelerator 120 and/or I/O tile 130 can be connected to CPU(s) 110 using CXL transactions running on UCIe interconnects 150, leveraging the I/O, coherency, and memory protocols of CXL. In the embodiment of FIG. 1, I/O tile 130 can provide an interface to external CXL, PCIe and DDR pins of the package. Statically or dynamically, accelerator 120 can also be connected to CPUs 110 using PCIe transactions running on UCIe interconnects 150.

Packages in accordance with an embodiment may be implemented in many different types of computing devices, ranging from small portable devices such as smartphones and so forth, up to larger devices including client computing devices and server or other datacenter computing devices. In this way, UCIe interconnects may enable local connectivity and long-reach connectivity at rack/pod levels. Although not shown in FIG. 1, understand that at least one UCIe retimer may be used to extend the UCIe connectivity beyond the package using an off-package interconnect. Examples of off-package interconnects include electrical cables, optical cables or any other technology to connect packages at a rack/pod level.

Embodiments may further be used to support a rack/pod-level disaggregation using a CXL 2.0 (or later) protocol. In such arrangement, multiple compute nodes (e.g., a virtual hierarchy) from different compute chassis couple to a CXL switch that can couple to multiple CXL accelerators/Type-3 memory devices, which can be placed in one or more separate drawers. Each compute drawer may couple to the switch using an off-package Interconnect running a CXL protocol through a UCIe retimer.

Figure 2A:
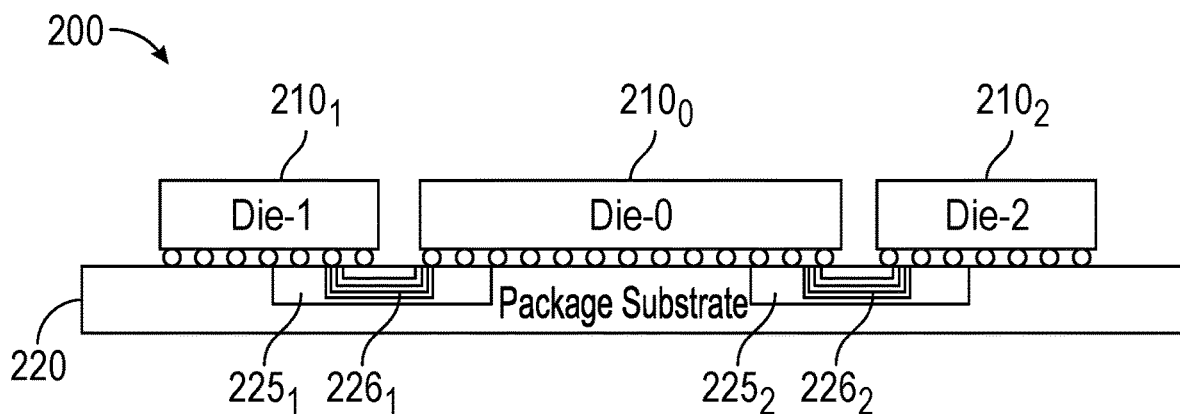
FIGS. 2A-2D are cross-sectional views of different packaging options incorporating embodiments.

Referring now to FIGS. 2A-2D, shown are cross-sectional views of different packaging options incorporating embodiments. As illustrated in FIG. 2A, package 200 may be an advanced package that provides advanced packaging technology. In one or more embodiments, an advanced package implementation may be used for performance optimized applications, including power-efficient performance applications. In some such example use cases, a channel reach may be short (e.g., less than 2 mm) and the interconnect can be optimized for high bandwidth and low latency with best performance and power efficiency characteristics.

As illustrated in FIG. 2A, package 200 includes a plurality of die $210_{0-2}$. Understand while three specific die are shown in FIG. 2A, many more die may be present in other implementations. Die 210 are adapted on a package substrate 220. In one or more embodiments, die 210 may be adapted to substrate 220 via bumps. As illustrated, package substrate 220 includes a plurality of silicon bridges $225_{1-2}$ that include on-package interconnects $226_{1-2}$. Interconnects 226 may be implemented as UCIe interconnects, and silicon bridges 225 may be implemented as Intel® EMIB bridges, in an embodiment.

Figure 2B:
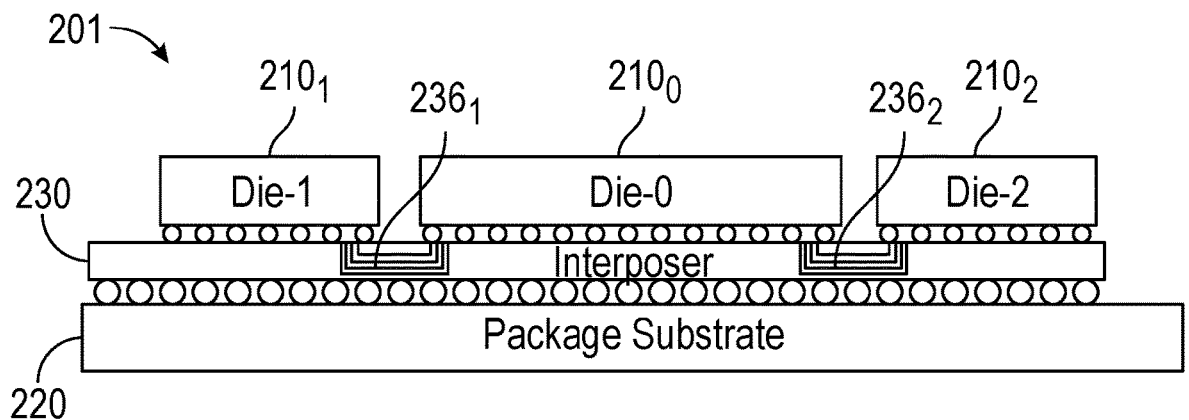

Referring now to FIG. 2B, shown is another embodiment of an advanced package, in which a package configuration is implemented as a Chip on Wafer on Substrate (CoWoS). In this illustration, package 201 includes die 210 that are adapted on an interposer 230, where this interposer includes corresponding on-package interconnects 236. In turn, interposer 230 adapts to package substrate 220 via bumps.

Figure 2C:
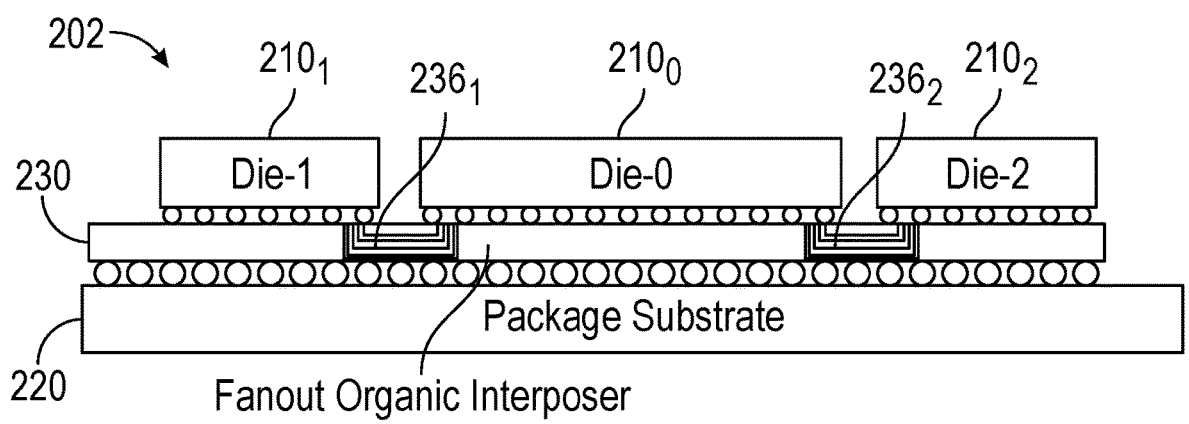

Referring now to FIG. 2C, shown is another embodiment of an advanced package, in which a package configuration is implemented with a fanout organic interposer 230. In this illustration, package 202 includes die 210 that are adapted on interposer 230 including corresponding on-package interconnects 236. In turn, interposer 230 adapts to package substrate 220 via bumps.

Figure 2D:
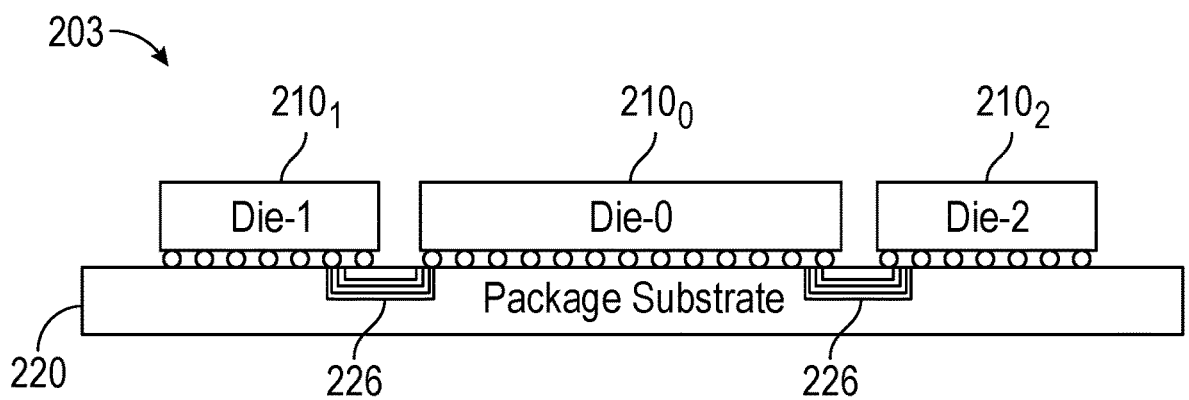

Referring now to FIG. 2D, shown is another package illustration. Package 203 may be a standard package that provides standard packaging technology. In one or more embodiments, a standard package implementations may be used for low cost and long reach (e.g., 10 mm to 25 mm) interconnects using traces on organic package/substrate, while still providing significantly better BER characteristics compared to an off-package SERDES. In this implementation, package 203 includes die 210 adapted to package substrate 220 where on-package interconnects 226 are adapted within package substrate 220 directly, without inclusion of silicon bridges or so forth.

Figure 3A:
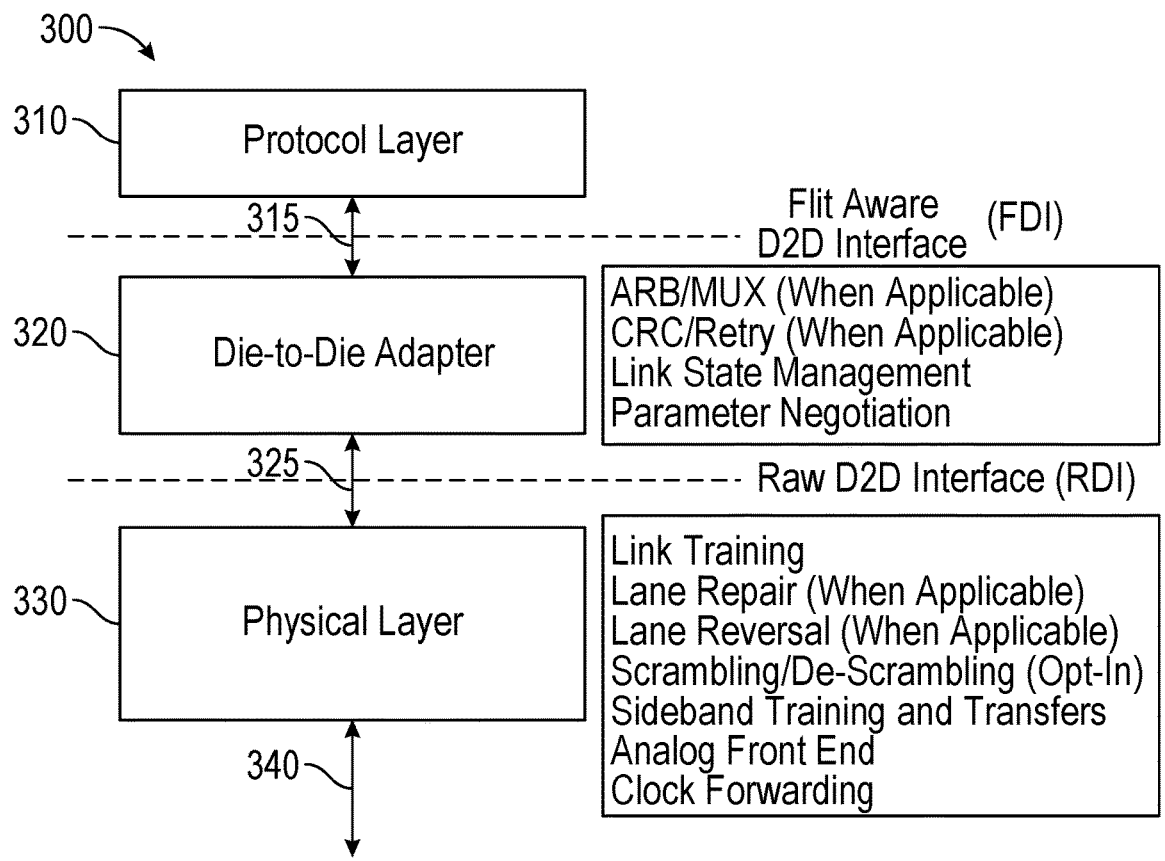
FIGS. 3A/3B is a block diagram of a layered protocol that may implement one or more embodiments.

Referring now to FIGS. 3A/3B, shown is a block diagram of a layered protocol that may implement one or more embodiments. As illustrated in the high level of FIG. 3A, multiple layers of a layered protocol implemented in a circuit 300 may implement an interconnect protocol. A protocol layer 310 may communicate information of one or more application-specific protocols. Protocol layer 310 may operate, in one or more implementations, according to one or more of a PCIe or CXL flit mode, and/or a streaming protocol to offer generic modes for a user-defined protocol to be transmitted. For each protocol, different optimizations and associated flit transfers are available.

In turn, protocol layer 310 couples to a die-to-die adapter (D2D) adapter 320 via an interface 315. In an embodiment, interface 315 may be implemented as a flit-aware D2D interface (FDI). In an embodiment, D2D adapter 320 may be configured to coordinate with protocol layer 310 and a physical layer 330 to ensure successful data transfer across a UCIe link 340. Adapter 320 may be configured to minimize logic on the main data path as much as possible, giving a low latency, optimized data path for protocol flits.

FIG. 3A illustrates various functionality performed within D2D adapter 320. D2D adapter 320 may provide link state management and parameter negotiation for connected dies (also referred to as "chiplets"). Still further D2D adapter 320 may optionally guarantee reliable delivery of data through cyclic redundancy check (CRC) and link level retry mechanism, e.g., where a raw BER is less than 1 e-27. When multiple protocols are supported, D2D adapter 320 may define the underlying arbitration mechanism. For example, when transporting communications of a CXL protocol, adapter 320 may provide arbitrator/multiplexer (ARB/MUX) functionality that supports communications of multiple simultaneous protocols. In one or more embodiments a flow control unit (flit) of a given size, e.g., 256 bytes, may define the underlying transfer mechanism when D2D adapter 320 is responsible for reliable transfer.

When operation is in a flit mode, die-to-die adapter 320 may insert and check CRC information. In contrast, when operation is in a raw mode, all information (e.g., bytes) of a flit are populated by protocol layer 310. If applicable, adapter 320 may also perform retry. Adapter 320 may further be configured to coordinate higher level link state machine management and bring up, protocol options related parameter exchanges with a remote link partner, and when supported, power management coordination with the remote link partner. Different underlying protocols may be used depending on usage model. For example, in an embodiment data transfer using direct memory access, software discovery, and/or error handling, etc. may be handled using PCIe/CXL.io; memory use cases may be handled through CXL.Mem; and caching requirements for applications such as accelerators can be handled using CXL.cache.

Figure 3B:
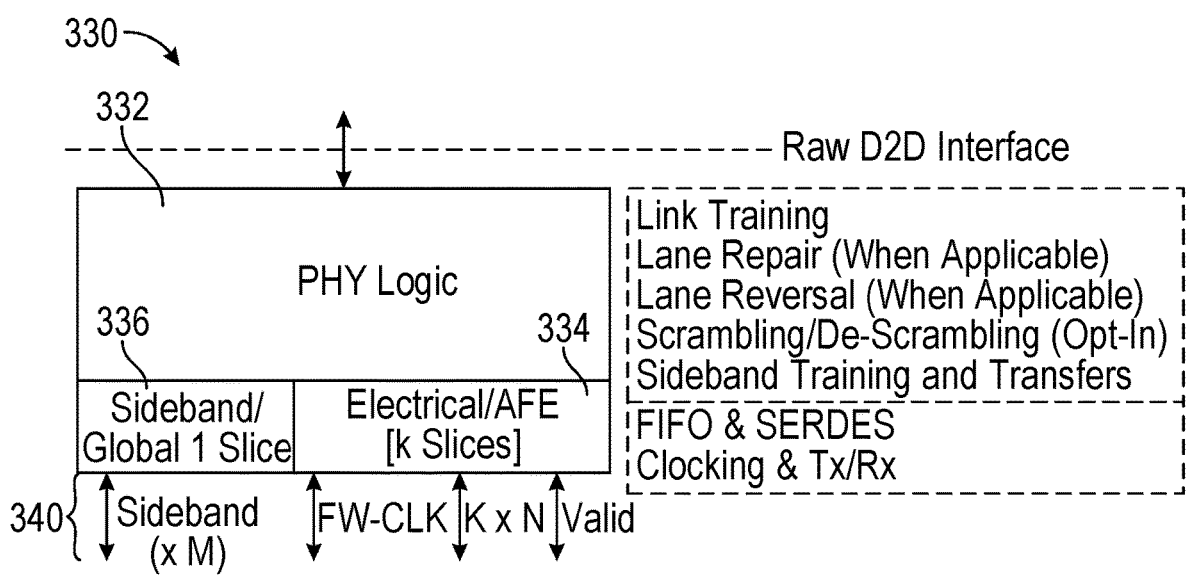

In turn, D2D adapter 320 couples to physical layer 330 via an interface 325. In an embodiment, interface 325 may be a raw D2D interface (RDI). As illustrated in FIG. 3B, physical layer 330 includes circuitry to interface with die-to-die interconnect 340 (which in an embodiment may be a UCIe interconnect or another multi-protocol capable on-package interconnect). In one or more embodiments, physical layer 330 may be responsible for the electrical signaling, clocking, link training, sideband, etc.

Interconnect 340 may include sideband and mainband links, which may be in the form of so-called "lanes," which are physical circuitry to carry signaling. In an embodiment, a lane may constitute circuitry to carry a pair of signals mapped to physical bumps or other conductive elements, one for transmission, and one for reception. In an embodiment, a xN UCIe link is composed of N lanes.

As illustrated in FIG. 3B, physical layer 330 includes three sub-components, namely a physical (PHY) logic 332, an electrical/analog front end (AFE) 334, and a sideband circuitry 336. In an embodiment, interconnect 340 includes a main band interface that provides a main data path on the physical bumps can be organized as a group of lanes called a Module or a Cluster.

The unit of construction of interconnect 340 is referred to herein equally as a "cluster" or "module." In an embodiment, a cluster may include N single-ended, unidirectional, full-duplex data lanes, one single-ended lane for Valid, one lane for tracking, a differential forwarded clock per direction, and 2 lanes per direction for sideband (single-ended clock and data). Thus a Module (or Cluster) forms the atomic granularity for the structural design implementation of AFE 334. There may be different numbers of lanes provided per Module for standard and advanced packages. For example, for a standard package 16 lanes constitute a single Module, while for an advanced package 64 lanes constitute a single Module. Although embodiments are not limited in this regard, interconnect 340 is a physical interconnect that may be implemented using one or more of conductive traces, conductive pads, bumps and so forth that provides for interconnection between PHY circuitry present on link partner dies.

A given instance of protocol layer 310 or D2D adapter 320 can send data over multiple Modules where bandwidth scaling is implemented. The physical link of interconnect 340 between dies may include two separate connections: (1) a sideband connection; and (2) a main band connection. In embodiments, the sideband connection is used for parameter exchanges, register accesses for debug/compliance and coordination with remote partner for link training and management.

In one or more embodiments, a sideband interface is formed of at least one data lane and at least one clock lane in each direction. Stated another way, a sideband interface is a two-signal interface for transmit and receive directions. In an advanced package usage, redundancy may be provided with an additional data and clock pair in each direction for repair or increased bandwidth. The sideband interface may include a forwarded clock pin and a data pin in each direction. In one or more embodiments, a sideband clock signal may be generated by an auxiliary clock source configured to operate at 800 MHz regardless of main data path speed. Sideband circuitry 336 of physical layer 330 may be provided with auxiliary power and be included in an always on domain. In an embodiment, sideband data may be communicated at a 800 megatransfers per second (MT/s) single data rate signal (SDR). The sideband may be configured to run on a power supply and auxiliary clock source which are always on. Each Module has its own set of sideband pins.

The main band interface, which constitutes the main data path, may include a forwarded clock, a data valid pin, and N lanes of data per Module. For an advanced package option, N=64 (also referred to as ×64) and overall four extra pins for lane repair are provided in a bump map. For a standard package option, N=16 (also referred to as ×16) and no extra pins for repair are provided. Physical layer 330 may be configured to coordinate the different functions and their relative sequencing for proper link bring up and management (for example, sideband transfers, main-band training and repair etc.).

In one or more embodiments, advanced package implementations may support redundant lanes (also referred to herein as "spare" lanes) to handle faulty lanes (including clock, valid, sideband, etc.). In one or more embodiments, standard package implementations may support lane width degradation to handle failures. In some embodiments, multiple clusters can be aggregated to deliver more performance per link.

Figure 4A:
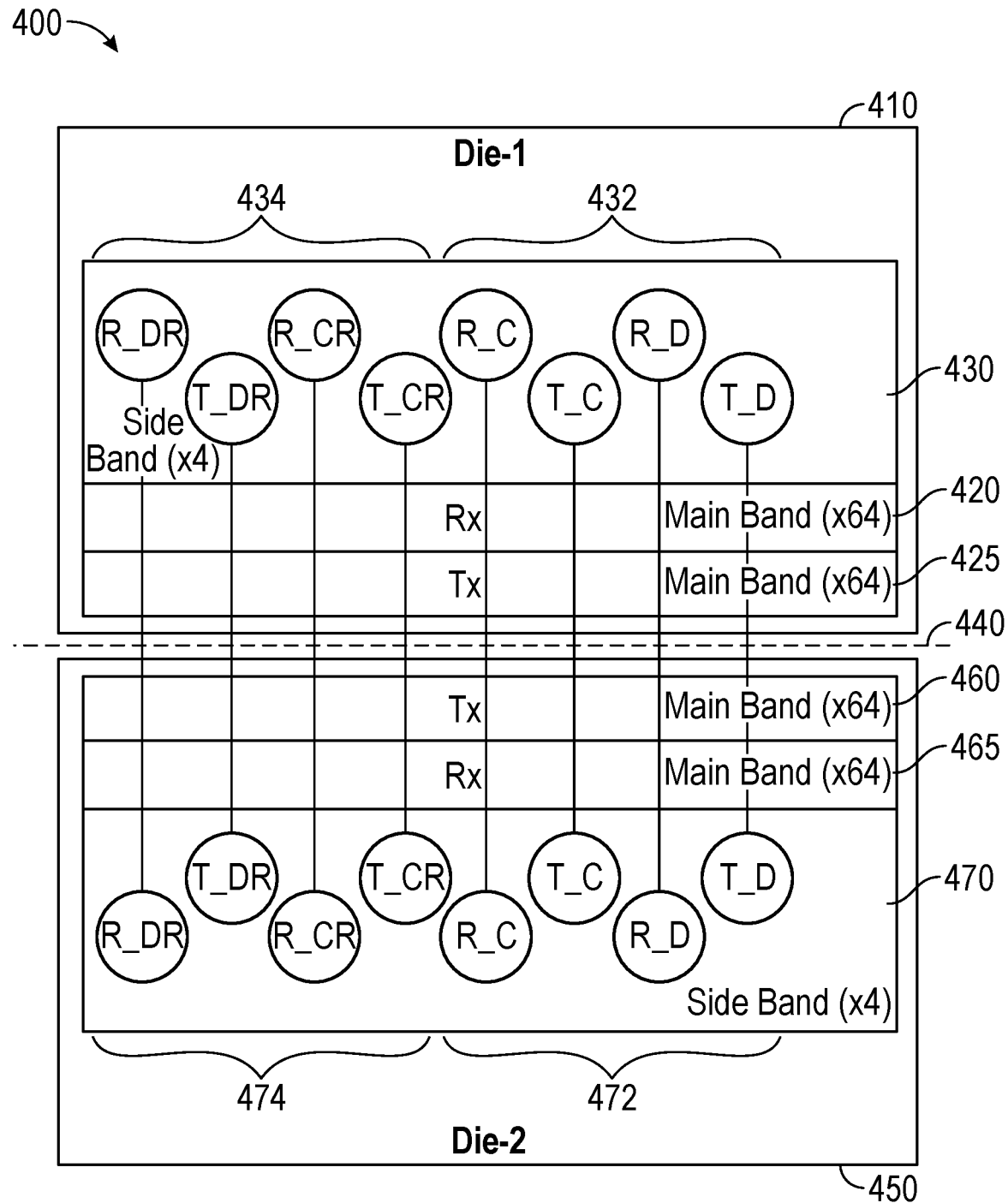
FIGS. 4A-4B are block diagrams of multi-die packages in accordance with various embodiments.

Referring now to FIG. 4A, shown is a block diagram of a multi-die package in accordance with an embodiment. As shown in FIG. 4A, package 400 includes at least a first die 410 and a second die 450. Understand that dies 410 and 450 may be various types of die including CPUs, accelerators, I/O devices or so forth. In the high level view shown in FIG. 4A, an interconnect 440 that couples the die together is illustrated as a dashed line. Interconnect 440 may be an instantiation of an on-package multi-protocol capable interconnect, e.g., a UCIe interconnect as described herein. While not shown in detail in FIG. 4A, understand that interconnect 440 may be implemented using conductive bumps adapted on each die, which may couple together to provide interconnection between the die. In addition, interconnect 440 further may include in-package circuitry such as conductive lines on or within one or more substrates. As used herein, understand that the term "lanes" refers to any and all interconnect circuitry that couples one die to another die.

In a particular embodiment, interconnect 440 may be a UCIe interconnect having one or more modules, where each module includes a sideband interface and a main band interface. In this high level view, the main band interface couples to main band receiver and transmitter circuitry within each die. Specifically, die 410 includes main band receiver circuitry 420 and main band transmitter circuitry 425, while in turn die 450 includes main band receiver circuitry 465 and main band transmitter circuitry 460.

FIG. 4A further shows connectivity for the sideband interface. In general, a sideband includes a data lane and a clock lane in each direction, and in an advanced package usage, redundancy may be provided with an additional data and clock pair in each direction. Thus FIG. 4A shows a first possible connectivity implementation between the sideband circuitry of the two die. Die 410 includes a sideband circuit 430 including first sideband circuitry 432 that includes corresponding sideband clock and data receivers (R_C and R_D) and sideband clock and data transmitters (T_C and T_D) that couple to corresponding sideband transmitter and receiver circuitry of a sideband circuitry 470 of second die 450, respectively. Sideband circuit 430 also includes second sideband circuitry 434 having similar circuitry for redundant sideband clock and data transmitters and receivers (enumerated as above, with an "R" terminating the transmitter and receiver abbreviations).

In FIG. 4A, a first sideband connectivity instantiation is illustrated, where sideband circuitry 432 and 472 act as a functional sideband, and sideband circuitry 434 and 474 acts as a redundant sideband.

Figure 4B:
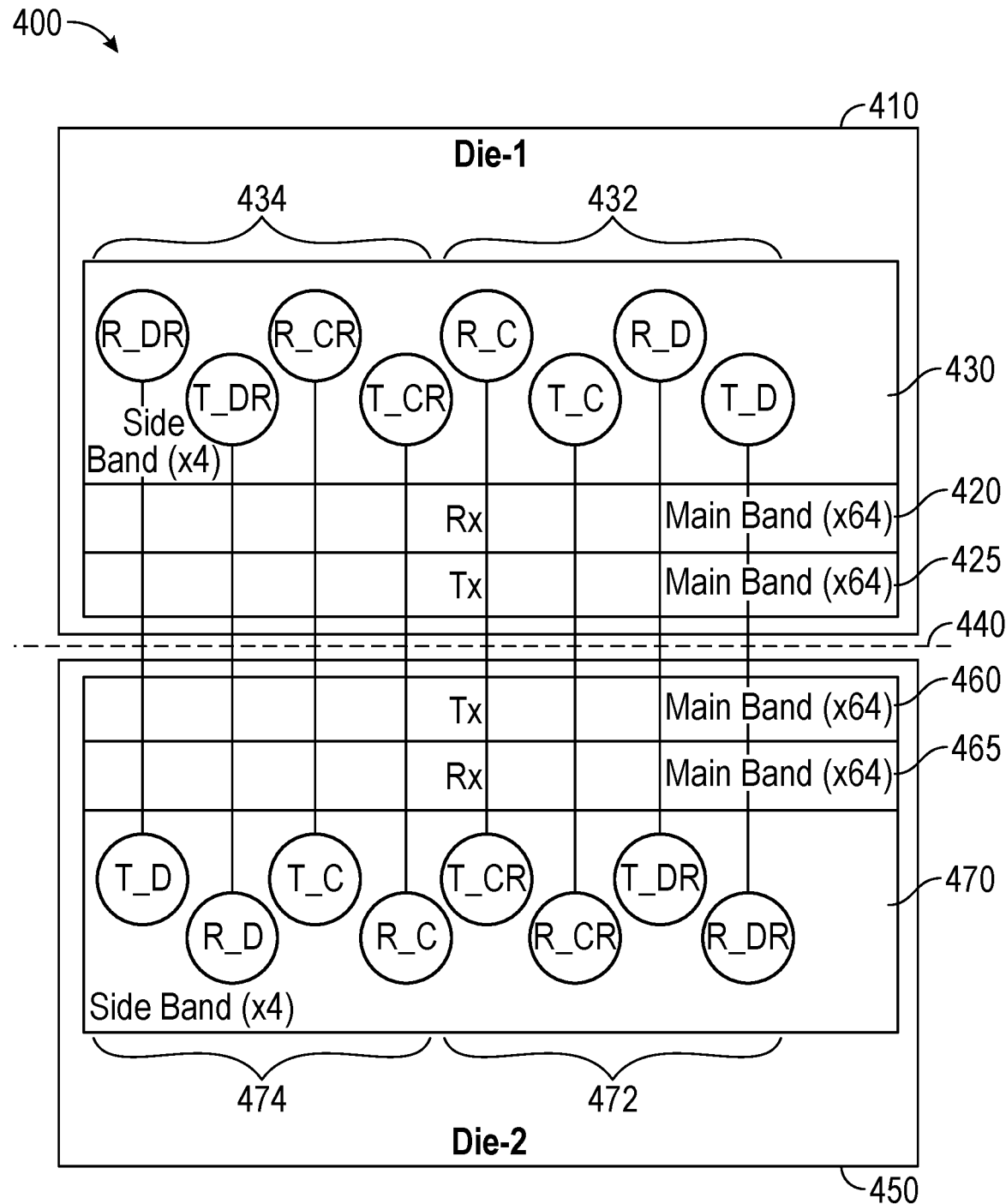

Depending upon a sideband detection that is performed during a sideband initialization, it may be determined that one or more of the sideband lanes and/or associated sideband circuitry is defective and thus at least a portion of redundant sideband circuitry can be used as part of a functional sideband. More specifically FIG. 4B shows a second possible connectivity implementation between the sideband circuitry of the two die. In this example, redundant sideband data transmitter and receiver are present in sideband circuitry 472 to act as part of the functional sideband.

In different implementations, an initialization and bring up flow may allow for any connectivity as long as data-to-data and clock-to-clock connectivity is maintained. If no redundancy is required based on such initialization, both sideband circuit pairs can be used to extend sideband bandwidth, enabling faster message exchanges. Note that while FIGS. 4A and 4B are shown in the context of an advanced package configuration, similar sideband circuitry may be present on die used in a standard package. However in certain implementations, redundant sideband circuitry and redundant sideband lanes may not be present in a standard package, as a standard package may not provide for redundancy and lane repair support.

Figure 5:
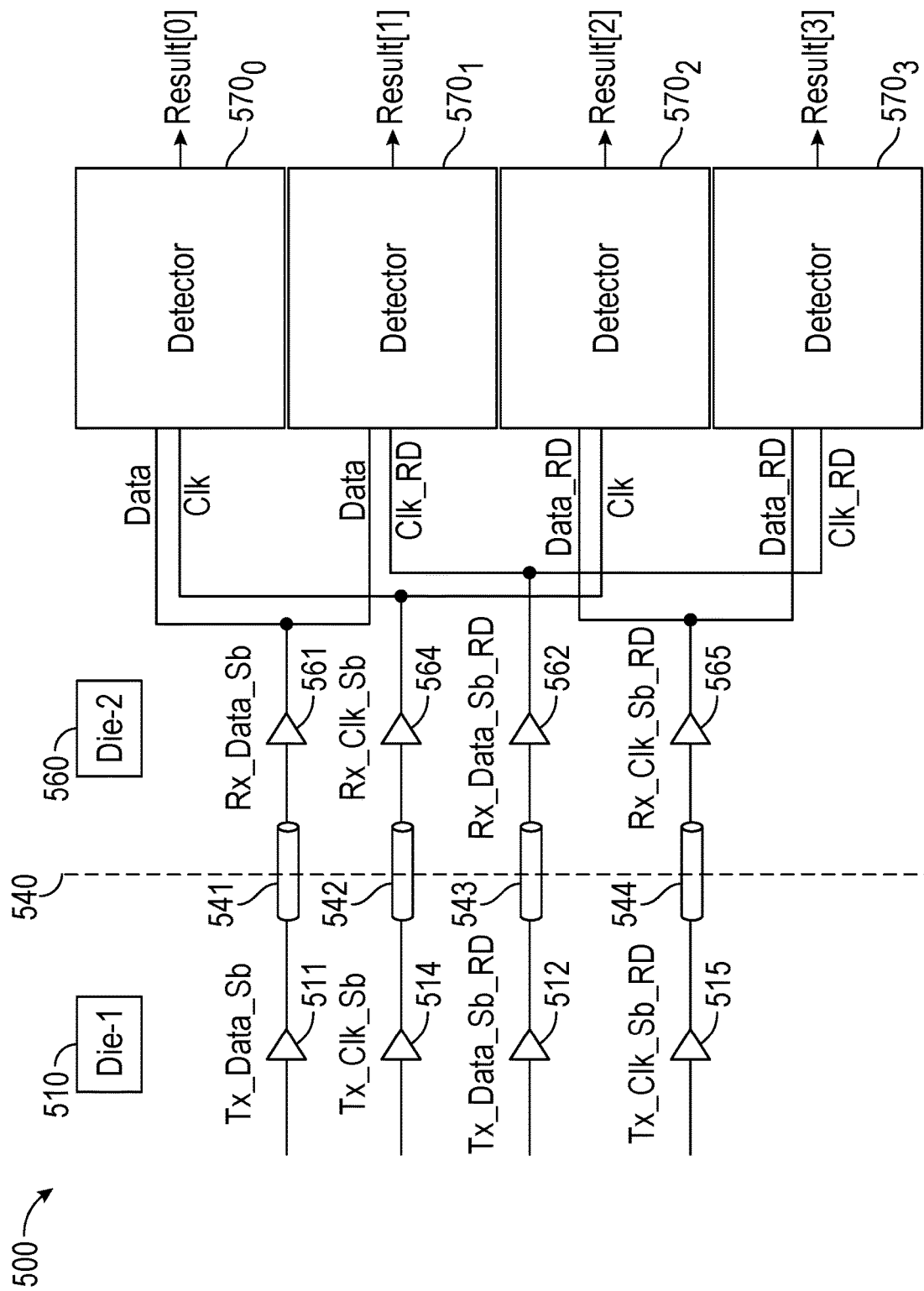
FIG. 5 is a schematic diagram illustrating a die-to-die connection in accordance with an embodiment.

Referring now to FIG. 5, shown is a schematic diagram illustrating a die-to-die connection in accordance with an embodiment. As shown in FIG. 5, a package 500 includes a first die 510 and a second die 560. An interconnect 540, e.g., a UCIe interconnect, includes a plurality of sideband lanes, namely sideband lanes 541-544. Understand while a single direction of sideband lanes is illustrated, corresponding sets of sideband lanes may also be provided for the other direction. First die 510 includes sideband data transmitters and sideband clock transmitters, namely, sideband data transmitters 511, 512 (where sideband data transmitter 512 is a redundant transmitter). First die 510 further includes sideband clock transmitters 514, 515 (where sideband clock transmitter 515 is a redundant transmitter). Second die 560 includes, in turn, sideband data receivers and sideband clock receivers, namely, sideband data receivers 561, 562 (where sideband data receiver 562 is a redundant receiver). Second die 560 further includes sideband clock receivers 564, 565 (where sideband clock receiver 565 is a redundant receiver).

Still referring to FIG. 5, detection circuitry is present in second die 560 that may be used to perform a sideband detection, which may be part of a sideband initialization to determine what lanes are to be included in a functional sideband and what lanes may be part of a redundant sideband. As illustrated, a plurality of detectors $570_{0-3}$ are provided. Each detector 570 receives an incoming sideband data signal and an incoming sideband clock signal such that each detector 570 receives the signals from different combinations of the sideband receivers of second die 560. During sideband initialization, the incoming sideband data signal may be a predetermined sideband initialization packet that includes a predetermined pattern. Detectors 570 may be configured to detect presence of this pattern and generate a first result (e.g., a logic 1) in response to valid detection of the pattern (e.g., for a number of iterations of the pattern) and generate a second result (e.g., a logic 0) in response to no detection of the predetermined pattern. Although embodiments are not limited in this regard, in one implementation detectors 570 may be configured with shift registers, counters and so forth to perform this detection operation and generate the corresponding result by sampling data and redundant data using a clock signal and a redundant clock signal, leading to four combinations.

Note that in cases where redundant sideband circuitry is not used for repair purposes, it may be used to increase bandwidth of sideband communications, particularly for data-intensive transfers. As examples, a sideband in accordance with an embodiment may be used to communicate large amounts of information to be downloaded, such as a firmware and/or fuse download. Or the sideband can be used to communicate management information, such as according to a given management protocol. Note that such communications may occur concurrently with other sideband information communications on the functional sideband.

Referring now to FIG. 6A, shown is a timing diagram illustrating sideband signaling in accordance with an embodiment. As shown in FIG. 6A, timing diagram 600 includes a sideband clock signal 610 and a sideband message signal 620. Sideband message formats may be defined as a 64-bit header with 32 bits or 64 bits of data that are communicated during 64 unit intervals (UIs). Sideband message signal 620 illustrates a 64-bit serial packet. Sideband data may be sent edge aligned with the clock (strobe) signal. A receiver of a sideband interface samples the incoming data with the strobe. For example, the negative edge of the strobe can be used to sample the data as the data uses SDR signaling.

Referring now to FIG. 6B, shown is a timing diagram illustrating sideband packet back-to-back transmission in accordance with an embodiment. As shown in FIG. 6B, timing diagram 601 illustrates a communication of a first sideband packet 622 followed by a second sideband packet 624. As shown, each packet may be a 64 bit serial packet that is sent during a 64 UI duration. More specifically, first sideband packet 622 is sent that in turn is followed by a 32 UI duration of logic low on both clock and data lanes, after which second sideband packet 624 is communicated. In embodiments, such signaling may be used for various sideband communications, including sideband messages during a sideband initialization.

Figure 7:
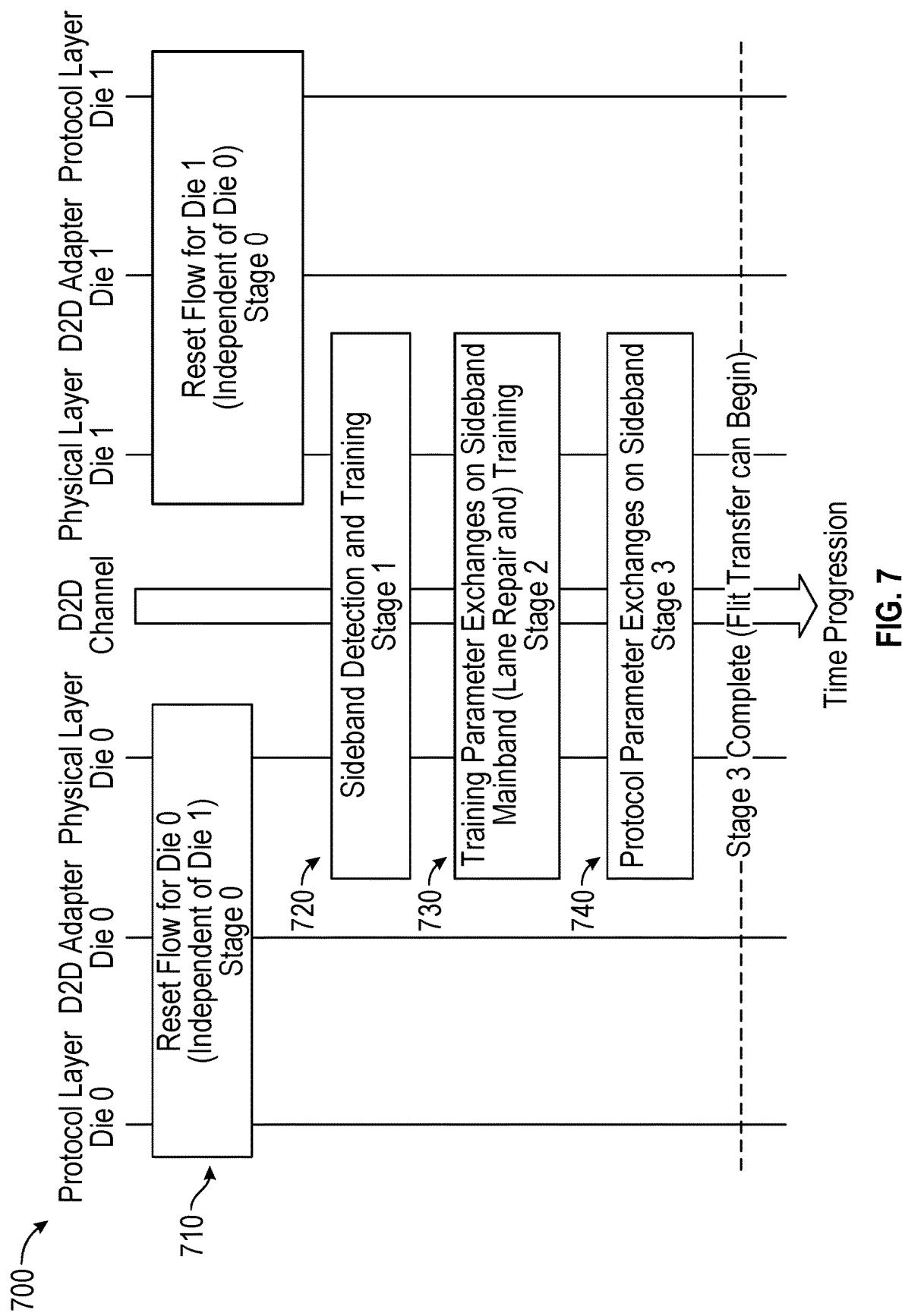
FIG. 7 is a flow diagram illustrating a bring up flow for an on-package multi-protocol capable interconnect in accordance with an embodiment.

Referring now to FIG. 7, shown is a flow diagram illustrating a bring up flow for an on-package multi-protocol capable interconnect in accordance with an embodiment. As shown in FIG. 7, a bring up flow 700 begins by independently performing reset flows on two dies (dies 0 and 1) that are coupled together via, e.g., a UCIe interconnect (illustrated in FIG. 7 as a D2D channel). Thus, a first die (die 0) performs an independent reset flow at stage 710, and a second die (die 1) also performs an independent reset flow at stage 710. Note that each die may exit its reset flow at different times. Next at stage 720 a sideband detection and training may be performed. In stage 720 the sideband may be detected and trained. In the case of an advanced package where lane redundancy is available, available lanes may be detected and used for sideband messages. Note that this sideband detection and training, which includes a sideband initialization as described herein, may be used to detect presence of activity in a coupled die, since as discussed above, each die may exit a reset flow at a different time. In one or more embodiments, a trigger for exiting out of reset and initiating link training is detection of a sideband message pattern. When training during link bring up as when a physical layer transitions out of a reset state, hardware is permitted to attempt training multiple times. During this bring up operation, synchronization may occur as every state and substate entry and exit for both dies is ensured to be in lockstep by a 4-way sideband message handshake between the dies.

At stage 730, training parameter exchanges may be performed on the functional sideband, and a main band training occurs. In stage 730, the main band is initialized, repaired and trained. Finally at stage 740, protocol parameter exchanges may occur on the sideband. In stage 740, the overall link may be initialized by determining local die capabilities, parameter exchanges with the remote die and a bring up of a FDI that couples a corresponding protocol layer with a D2D adapter of the die. In an embodiment, the mainband, by default, initializes at the lowest allowed data rate in the mainband initialization, where repair and reversal detection are performed. The link speed then transitions to a highest common data rate that is detected through the parameter exchange. After link initialization, the physical layer may be enabled to performed protocol flit transfers via the mainband.

In one or more embodiments, different types of packets may be communicated via a sideband interface, and may include: (1) register accesses, which can be Configuration (CFG) or Memory Mapped Reads or Writes and can be 32-bit or 64-bits (b); (2) messages without data, which can be Link Management (LM), or Vendor Defined Packets, and which do not carry additional data payloads; (3) messages with data, which can be Parameter Exchange (PE), Link Training related or Vendor Defined, and carry 64 b of data. Packets may carry a 5-bit opcode, 3-bit source identifier (srcid), and a 3-bit destination identifier (dstid). The 5-bit opcode indicates the packet type, as well as whether it carries 32 b of data or 64 b of data.

Flow control and data integrity sideband packets can be transferred across FDI, RDI or the UCIe sideband link. Each of these have independent flow control. For each transmitter associated with FDI or RDI, a design time parameter of the interface can be used to determine the number of credits advertised by the receiver, with a maximum of 32 credits. Each credit corresponds to 64 bits of header and 64 bits of potentially associated data. Thus, there is only one type of credit for all sideband packets, regardless of how much data they carry. Every transmitter/receiver pair has an independent credit loop. For example, on RDI, credits are advertised from physical layer to adapter for sideband packets transmitted from the adapter to the physical layer; and credits are also advertised from adapter to the physical layer for sideband packets transmitted from the physical layer to the adapter. The transmitter checks for available credits before sending register access requests and messages. The transmitter does not check for credits before sending register access completions, and the receiver guarantees unconditional sinking for any register access completion packets. Messages carrying requests or responses consume a credit on FDI and RDI, but they are guaranteed to make forward progress by the receiver and not be blocked behind register access requests. Both RDI and FDI give a dedicated signal for sideband credit returns across those interfaces. All receivers associated with RDI and FDI check received messages for data or control parity errors, and these errors are mapped to Uncorrectable Internal Errors (UIE) and transition the RDI to the LinkError state.

Figure 8:
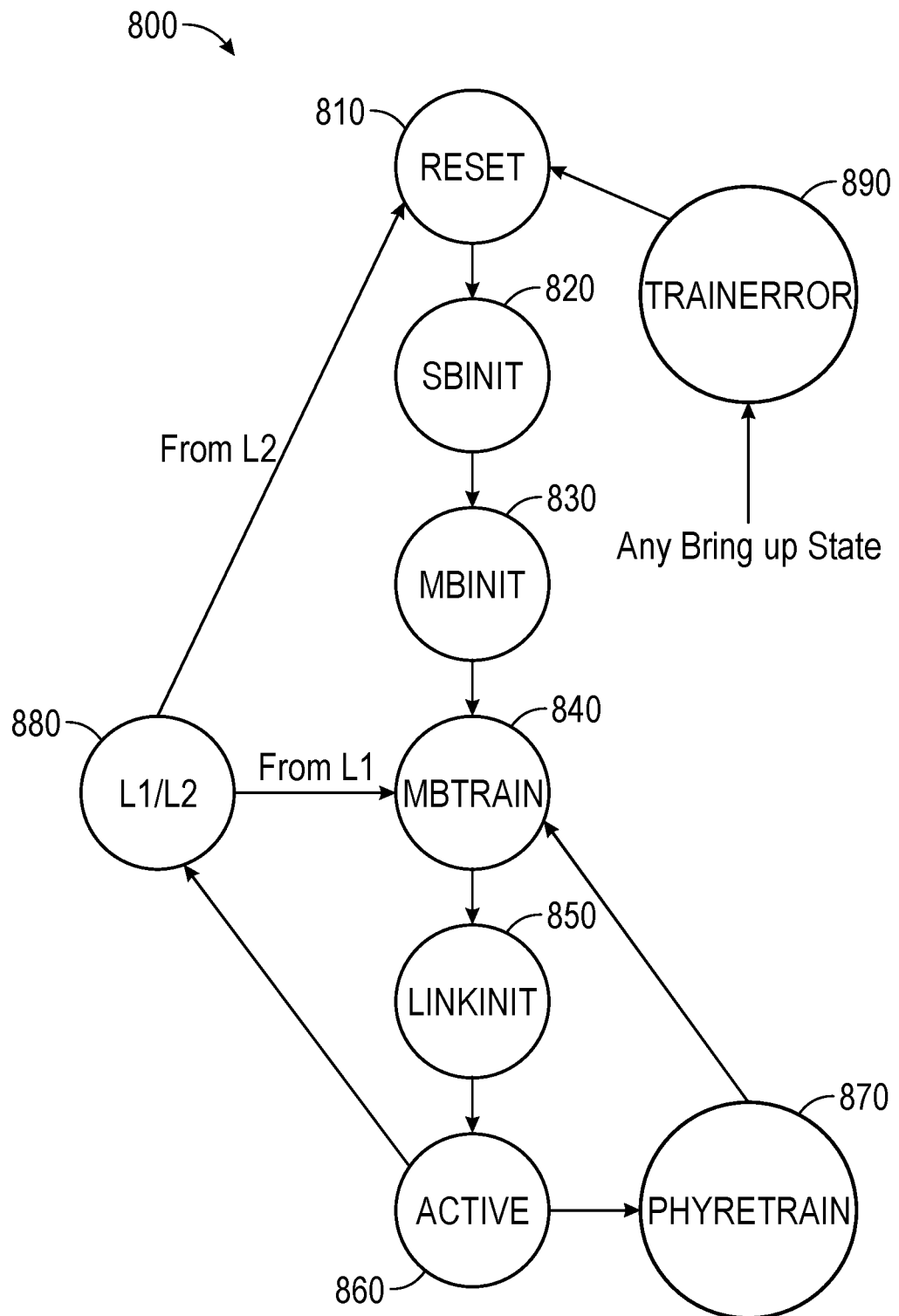
FIG. 8 is a flow diagram of a link training state machine in accordance with an embodiment.

Referring now to FIG. 8, shown is a flow diagram of a link training state machine in accordance with an embodiment. As shown in FIG. 8, method 800 is an example of a link initialization performed, e.g., by logical physical layer circuitry, which may include the link state machine. Table 1 is a high level description of the states of a link training state machine in accordance with an embodiment, and the details and actions performed in each state are described below.

TABLE 1

| STATE | DESCRIPTION |
| --- | --- |
| RESET | This is the state following primary reset or exit from TRAINERROR |

TABLE 1-continued

| STATE | DESCRIPTION |
| --- | --- |
| SBINIT | Side band initialization state where the side band is detected, repaired (when applicable) and out of reset message is transmitted |
| MBINIT | Following sideband initialization, Main band (MB) is initialized at the lowest speed. Both dies perform on die calibration followed by interconnect repair (when applicable) |
| MBTRAIN | Main band (Data, Clock and Valid signals) speed of operation is set to the highest negotiated data rate. Die-to-Die training of main band is performed to center the clock with respect to Data. |
| LINKINIT | This state is used to exchange Adapter and Link management messages |
| ACTIVE | This is the state in which transactions are sent and received |
| PHYRETRAIN | This state is used to begin the retrain flow for the Link during runtime |
| TRAINERROR | State is entered when a fatal or non-fatal event occurs at any point during Link Training or operation. |

With reference to FIG. 8, method 800 begins in a reset state 810. In an embodiment, a PHY stays in the reset state for a predetermined minimum duration (e.g., 4 ms) to allow various circuitry including phase lock loops (PLLs) to stabilize. This state may be exited when power supplies are stable, a sideband clock is available and running, main band and die-to-die adapter clocks are stable and available, a main band clock is set to a slowest IO data rate (e.g., 2 GHz for 4 GT/s), and a link training trigger has occurred. Next control passes to a sideband initialization (SBINIT) state 820, where sideband initialization may be performed. In this state, the sideband interface is initialized and repaired (when applicable). During this state, mainband transmitters may be tri-stated and mainband receivers are permitted to be disabled.

Still with reference to FIG. 8, from sideband initialization state 820, control passes to a main band initialization (MBINIT) state 830 in which a main band initialization is performed. In this state, the main band interface is initialized and repaired or degraded (when applicable). The data rate on the main band may be set to a lowest supported data rate (e.g., 4 GT/s). For an advanced package, interface interconnect repair may be performed. Sub-states in MBINIT allow detection and repair of data, clock, track and valid lanes. For a standard package interface where no lane repair is needed, sub-states are used to check functionality at a lowest data rate and perform width degrade if needed.

Next at block 840, a main band training (MBTRAIN) state 840 is entered in which main band link training may be performed. In this state, operational speed is set up and clock to data centering is performed. At higher speeds, additional calibrations like receiver clock correction, transmit and receive de-skew may be performed in sub-states to ensure link performance. Modules enter each sub-state and exit of each state is through a sideband handshake. If a particular action within a sub-state is not needed, the UCIe Module is permitted to exit it though the sideband handshake without performing the operations of that sub-state. This state may be common for advanced and standard package interfaces, in one or more embodiments.

Control then proceeds to block 850 where a link initialization (LINKINIT) state occurs in which link initialization may be performed. In this state, a die-to-die adapter completes initial link management before entering an active state on a RDI. Once the RDI is in the active state, the PHY clears its copy of a "Start UCIe link training" bit from a link control register. In embodiments, a linear feedback shift register (LFSR) is reset upon entering this state. This state may be common for advanced and standard package interfaces, in one or more embodiments.

Finally, control passes to an active state 860, where communications may occur in normal operation. More specifically, packets from upper layers can be exchanged between the two dies. In one or more embodiments, all data in this state may be scrambled using a scrambler LFSR.

Still with reference to FIG. 8, note that during active state 860 a transition may occur either to a retrain (PHYRETRAIN) state 870 or a low power (L2/L1) link state 880 may occur. As seen, depending upon the level of the low power link state, exit may proceed either to main band training state 840 or reset state 810. In the low power link states, lower power is consumed than dynamic clock gating in an ACTIVE state. This state may be entered when an RDI has transitioned to a power management state. When a local adapter requests an active on the RDI or a remote link partner requests L1 exit, the PHY exits to the MBTRAIN-.SPEEDIDLE state. In one or more embodiments, L1 exit is coordinated with the corresponding L1 state exit transitions on the RDI. When the local adapter requests the active state on RDI or the remote link partner requests L2 exit, the PHY exits to the RESET state. Note that L2 exit may be coordinated with the corresponding L2 state exit transitions on the RDI.

As further shown in FIG. 8, should an error occur during any of the bring up states, control passes to block 890 where a train error state may occur. This state is used as a transitional state due to any fatal or non-fatal events to bring the state machine back to the RESET state. If the sideband is active, a sideband handshake is performed for the link partners to enter TRAINERROR state from any state other than SBINIT.

In an embodiment, a die can enter the PHYRETRAIN state for a number of reasons. The trigger may be by an adapter-directed PHY retrain or a PHY-initiated PHY retrain. A local PHY initiates a retrain on detecting a Valid framing error. A remote die may request PHY retrain, which causes a local PHY to enter PHY retrain on receiving this request. This retrain state also may be entered if a change is detected in a Runtime Link Testing Control register during MBTRAIN.LINKSPEED state. Understand while shown at this high level in the embodiment of FIG. 8, many variations and alternatives are possible.

Figure 9:
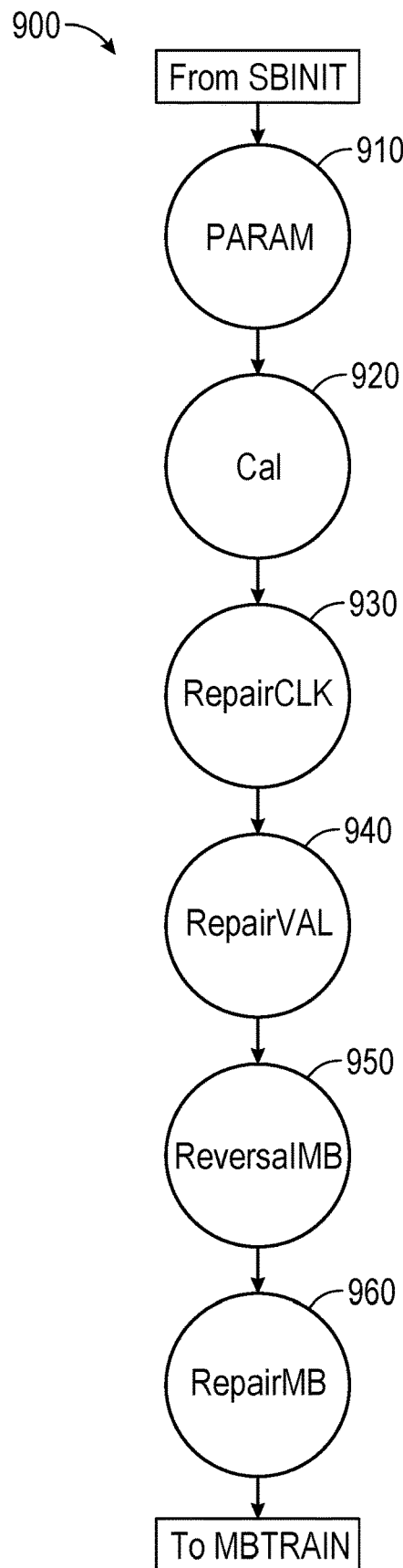
FIG. 9 is a flow diagram of further details of a main band initialization in accordance with an embodiment.

Referring now to FIG. 9, shown is a flow diagram of further details of a main band initialization in accordance with an embodiment. Method 900 may be implemented by the link state machine to perform main band initialization. As shown, this initialization proceeds through a plurality of states, including a parameter exchange state 910, a calibration state 920, a repair clock state 930, a repair validation state 940, a reversal main band state 950, and finally a main band repair state 960. After completion of this main band initialization, control proceeds to main band training.

In parameter exchange state 910, an exchange of parameters may occur to setup the maximum negotiated speed and other PHY settings. In an embodiment, the following parameters may be exchanged with a link partner (e.g., on a per Module basis): voltage swing; maximum data rate; clock mode (e.g., strobe or continuous clock); clock phase; and Module ID. In state 920, any calibration needed (e.g., transmit duty cycle correction, receiver offset and Vref calibration) may be performed.

Next at block 930, detection and repair (if needed) to clock and track Lanes for Advanced Package interface and for functional check of clock and track Lanes for Standard Package interface can occur. At block 940, A Module may set the clock phase at the center of the data UI on its mainband transmitter. The Module partner samples the received Valid with the received forwarded clock. All data lanes can be held at low during this state. This state can be used to detect and apply repair (if needed) to Valid Lane.

Still referring to FIG. 9, block 950 is entered only if clock and valid lanes are functional. In this state, data lane reversal is detected. All transmitters and receivers of a Module are enabled. The Module sets the forwarded clock phase at the center of the data UI on its mainband. The Module partner samples the incoming data with the incoming forwarded clock. A 16-bit "Per Lane ID" pattern (unscrambled) is a lane specific pattern using a Lane ID for the corresponding lane.

Still referring to FIG. 9, at block 960, which is entered only after lane reversal detection and application is successful, all the transmitters and receivers of a Module are enabled. The Module sets the clock phase at the center of the data UI for its mainband. The Module partner samples the incoming data with the incoming forwarded clock on its mainband receivers. In this state, the main band lanes are detected and repaired if needed for Advanced Package interface and for functional check and width degrade for Standard Package interface. Stated another way, if an error is detected in a lane, redundant circuitry can be enabled via a redundant lane.

In example embodiments, several degrade techniques may be used to enable a link to find operational settings, during bring up and operation. First a speed degrade may occur when an error is detected (during initial bring up or functional operation) and repair is not required. Such speed degrade mechanism may cause the link to go to a next lower allowed frequency; this is repeated until a stable link is established. Second a width degrade may occur if repair is not possible (in case of a standard package link where there are no repair resources), the width may be allowed to degrade to a half width configuration, as an example. For example, a 16 lane interface can be configured to operate as an 8 lane interface.

Figure 10:
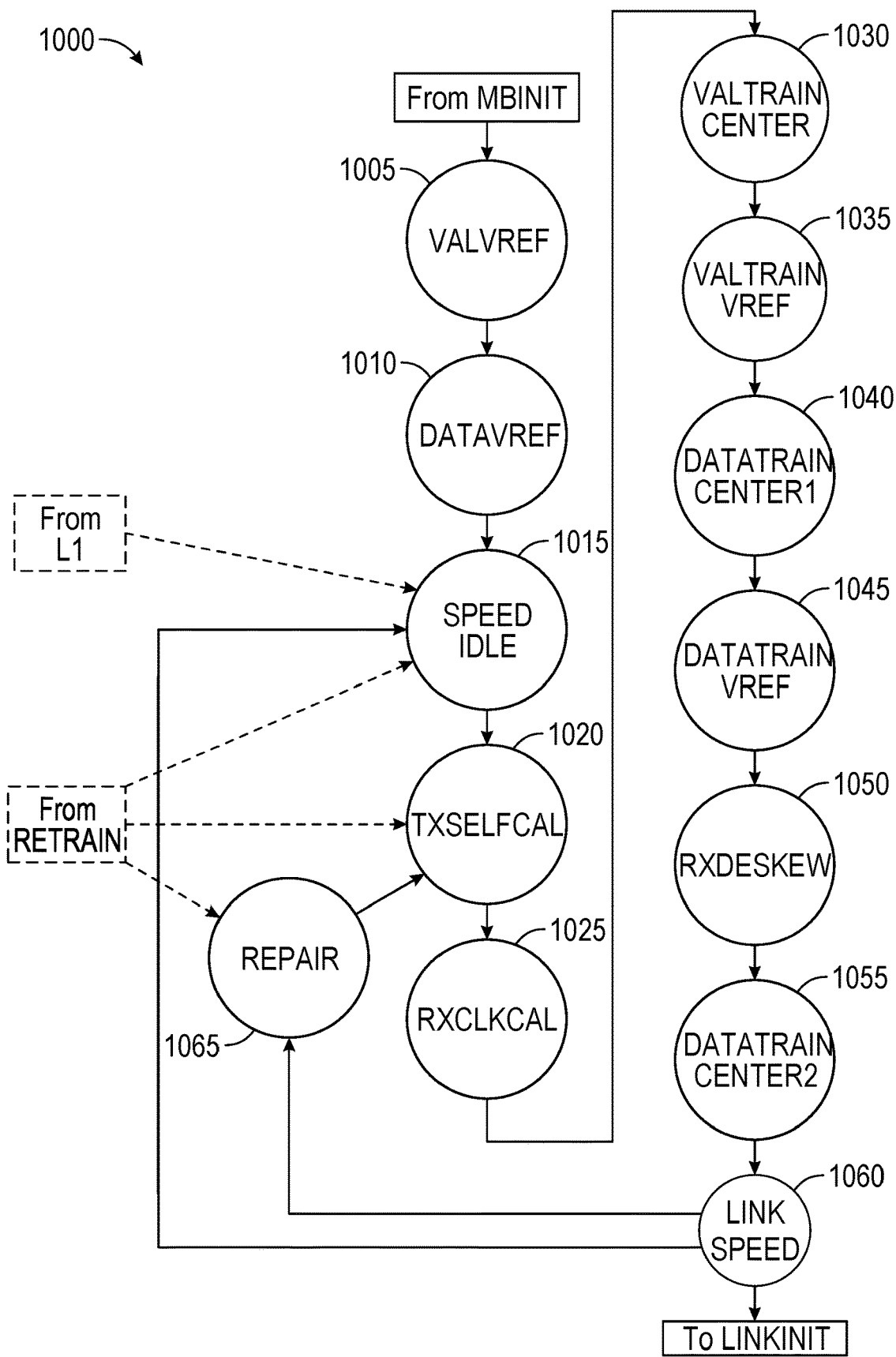
FIG. 10 is a flow diagram of a main band training in accordance with an embodiment.

Referring now to FIG. 10, shown is a flow diagram of a main band training in accordance with an embodiment. As shown in FIG. 10, method 1000 may be implemented by the link state machine to perform main band training. In main band training, the main band data rate is set to the highest common data rate for the two connected devices. Data to clock training, deskew and Vref training may be performed using multiple sub states. As shown in FIG. 10, main band training proceeds through a plurality of states or sub-states. As illustrated, main band training begins by performing valid reference voltage training state 1005. In state 1005, a receiver reference voltage (Vref) to sample the incoming Valid is optimized. The data rate on the main band continues to be at the lowest supported data rate. The Module partner sets the forwarded clock phase to the center of the data UI on its main band transmitters. The receiver Module samples the pattern on the Valid signal with the forwarded clock. All data lanes are held low during Valid lane reference voltage training. Control next proceeds to a data reference voltage state 1010, where a receiver reference voltage (Vref) to sample the incoming data is optimized, while the data rate continues to be at the lowest supported data rate (e.g., 4 GT/s). The transmitter sets the forwarded clock phase at the center of the data UI. Thereafter, an idle speed state 1015 occurs where a frequency change may be allowed in this electrical idle state; more specifically, the data rate may be set to the maximum common data rate decided in the previous state. Thereafter, circuit parameters may be updated in transmitter and receiver calibration states (1020 and 1025).

Still referring to FIG. 10, various training states 1030, 1035, 1040 and 1045 may proceed to respectively train valid-to-clock training reference voltage level, full data-to-clock training, and data receiver reference voltages. In state 1030, to ensure the valid signal is functional, valid-to-clock training is performed before data lane training. The receiver samples the pattern on valid with the forwarded clock. In state 1035, the Module may optimize the reference voltage (Vref) to sample the incoming valid at the operating data rate. In state 1040, the Module performs full data to clock training (including valid) using LFSR patterns. In state 1045, the Module may optimize the reference voltage (Vref) on its data receivers to optimize sampling of the incoming data at the operating data rate.

Still with reference to FIG. 10, thereafter a receiver deskew state 1050 may occur, which is a receiver-initiated training step for the receiver to perform lane-to-lane deskew, to improve timing margin. Next another data training state 1055 occurs in which the Module may re-center the clock to aggregate data in case the Module partner's receiver performed a per lane deskew. Control next passes to a link speed state 1060, where link stability at the operating data rate may be checked after the final sampling point is set in state 1055. If the link performance is not met at the data rate, speed is degraded to a next lower supported data rate and training is performed again. Depending upon the result of such state, main band training may conclude, with control next passing to a link initialization. Otherwise, either a link speed change at state 1015 or a repair state 1065 may occur. Note that entry into states 1015 and 1065 also may occur from a low power state (e.g., a L1 link power state) or a retraining state. Understand while shown at this high level in the embodiment of FIG. 10, many variations and alternatives are possible.

Figure 11A:
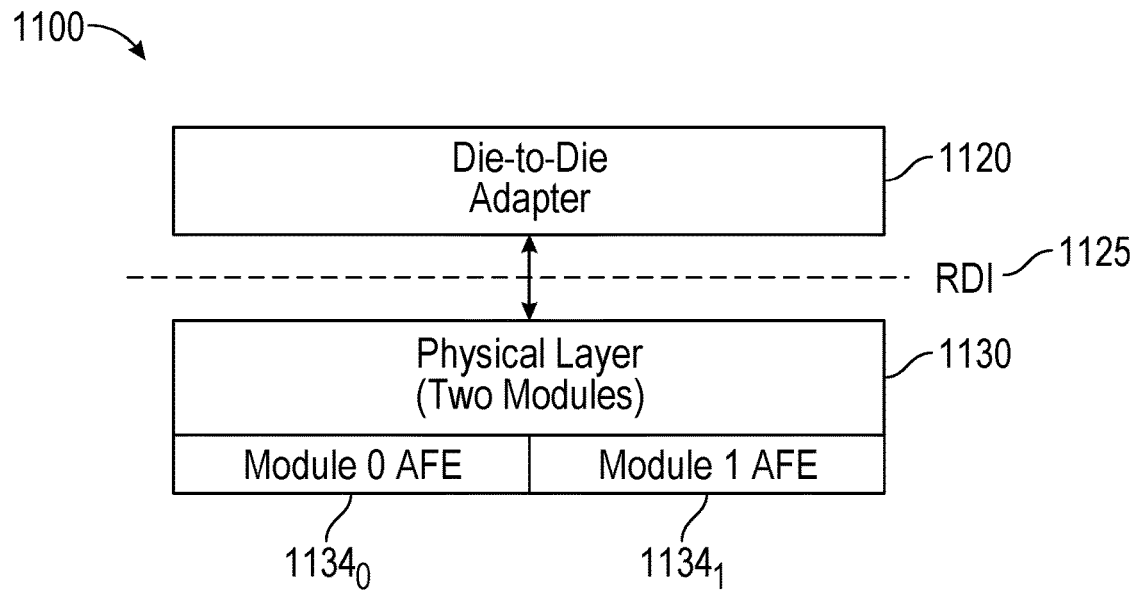
FIGS. 11A-11E are block diagrams of portions of a layered protocol in accordance with other embodiments.

Referring now to FIG. 11A, shown is a block diagram of a portion of a layered protocol in accordance with another embodiment. More specifically, in FIG. 11A a circuit 1100 includes a D2D adapter 1120 coupled to a physical layer 1130 via an RDI 1125. Note that circuit 1100 may be implemented similarly to circuit 300 of FIG. 3 (and thus reference is to the same numerals (albeit of the "1100" series in FIG. 11A, rather than the "300" series of FIG. 3)), and details of similar components are not further discussed. Note however that in FIG. 11A, physical layer 1130 supports multiple modules, namely a first module having a first analog front end $1134_0$ and a second module having a second analog front end $1134_1$. With circuit 1100, RDI 1125 has a data path that is parameterized so that a single instantiation of D2D adapter 1120 can use multiple analog front ends of physical layer 1130 to transmit and receive data. In different embodiments, each module may provide for, e.g., 16 or 64 mainband data lanes and additional redundant lanes as described herein.

In embodiments, a single instance of an RDI may be used for a configuration associated with a single D2D adapter (for one module), or a single instance may also be applicable for configurations where multiple modules are grouped together for a single logical D2D adapter (for multiple modules).

Figure 11B:
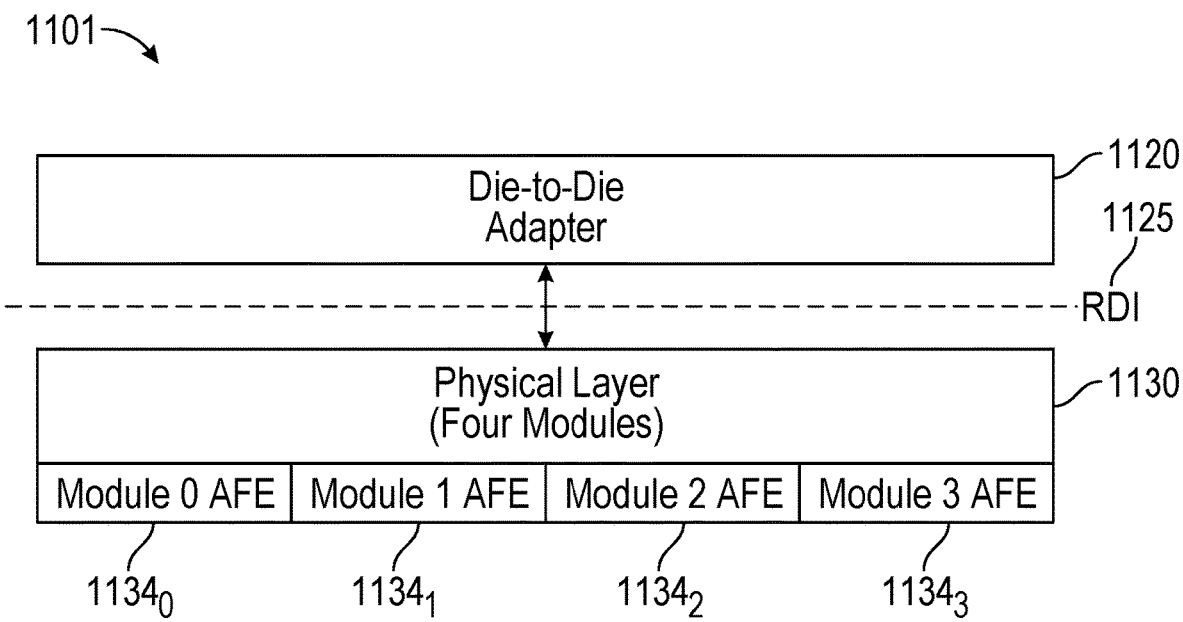

Still further implementations are possible. For example, a single D2D adapter may be associated with four individual modules each having their own analog front end. Thus as shown in FIG. 11B, circuit 1101 may be implemented similarly as in FIG. 11A; however here physical layer 1130 includes four modules having individual analog front ends $1134_{0-3}$.

Still other implementations are possible in which there may be multiple FDI instances. That is, it is possible for a single D2D adapter instantiation to host multiple protocol stacks with multiple FDI instances, where each instance maintains an independent state machine.

Figure 11C:
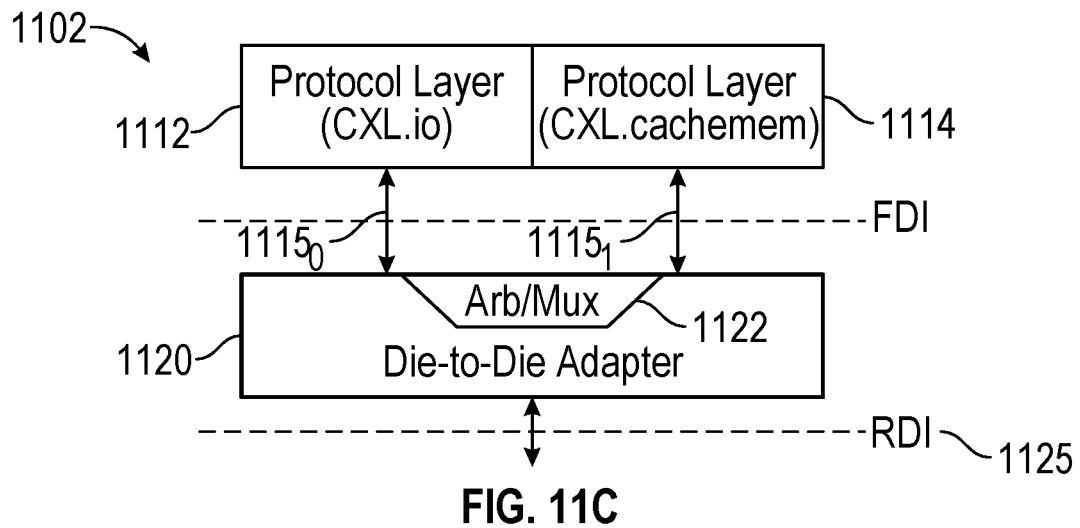

Referring now to FIG. 11C, shown is a block diagram of a portion of a layered protocol in accordance with yet another embodiment. As illustrated, circuit 1102 has a protocol layer 1110 having a single CXL stack with multiple constituent protocols. Namely as shown, a first protocol layer 1112 may be used for CXL.i/o communication, while a second protocol layer 1114 may be used for CXL.cache or CXL.mem communications. As seen, each of these individual protocol layers 1112, 1114 couple via independent FDIs $1115_{0,1}$ to D2D adapter 1120. To be able to handle communications of both of these protocol layers, a D2D adapter includes an arbitrator/multiplexer (ARB/MUX 1122).

Figure 11D:
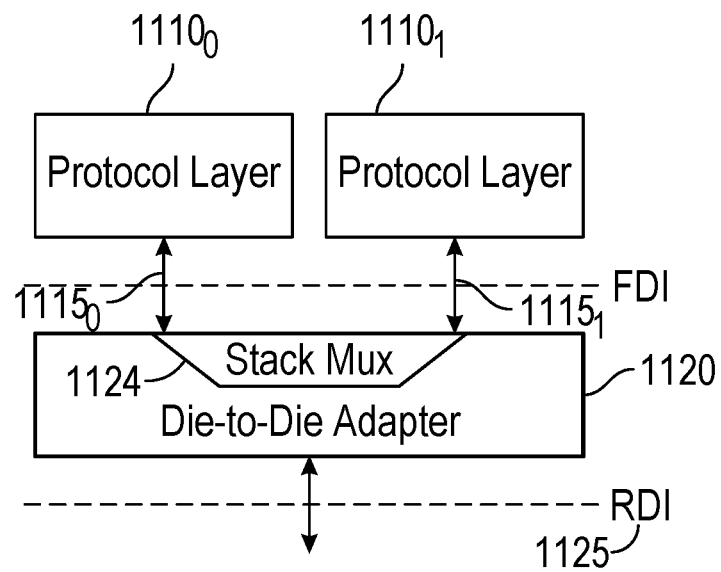

In yet further cases, multiple protocol stacks may couple via independent FDI instances to a D2D adapter. Thus as shown in FIG. 11D, a circuit 1103 includes independent protocol layers $1110_{0,1}$ that each may couple via independent FDIs $1115_{0,1}$ to D2D adapter 1120. More specifically as shown, the communications of these multiple protocol layers may be provided to a stack multiplexer 1124 within D2D adapter 1120.

Figure 11E:
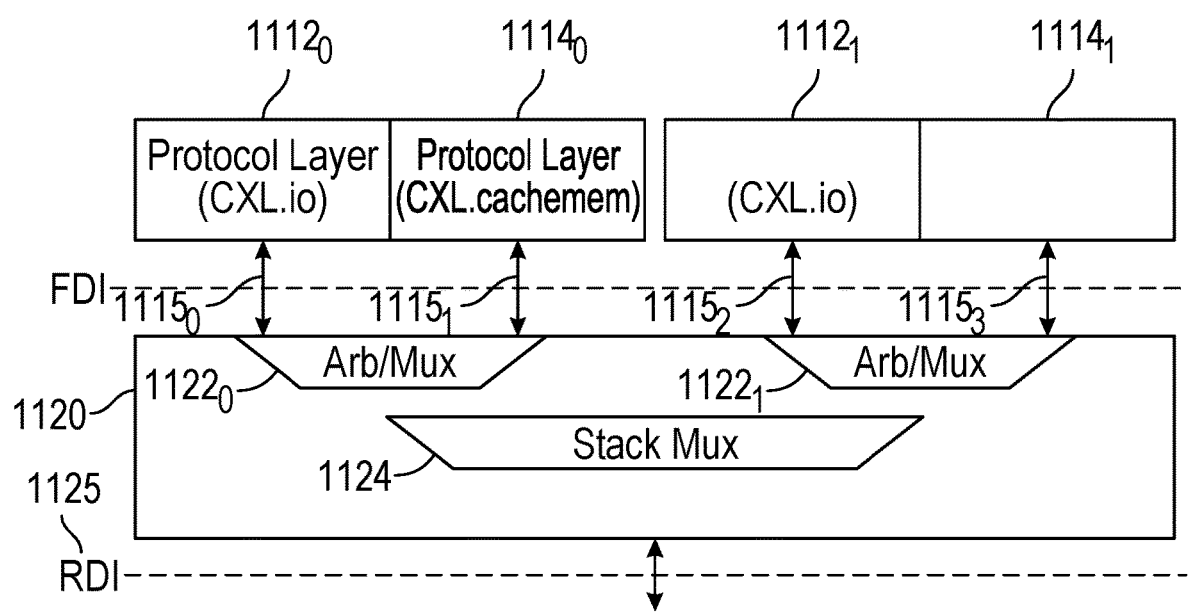

In yet other cases, multiple CXL stacks may be provided and interconnected by way of independent FDI instantiations to D2D adapter 1120. Thus as shown in FIG. 11E, two CXL stacks have protocol layers $1112_{0,1}$ and $1124_{0,1}$ all of which may couple via independent FDIs $1115_{0-3}$ to D2D adapter 1120. As shown, the communications of these multiple protocol layers may be provided to separate ARB/MUX implementations $1122_{0,1}$ that in turn couple to stack multiplexer 1124.

As discussed above, e.g., with regard to FIG. 7, a bring up flow for multiple dies coupled together in a package may use sideband messages. For purposes of a bring up flow for an RDI, such sideband messages may be used to negotiate active state transitions. The sequencing of an RDI bring up flow may rely on a physical layer fully completing link training before beginning the RDI bring up flow.

Figure 12:
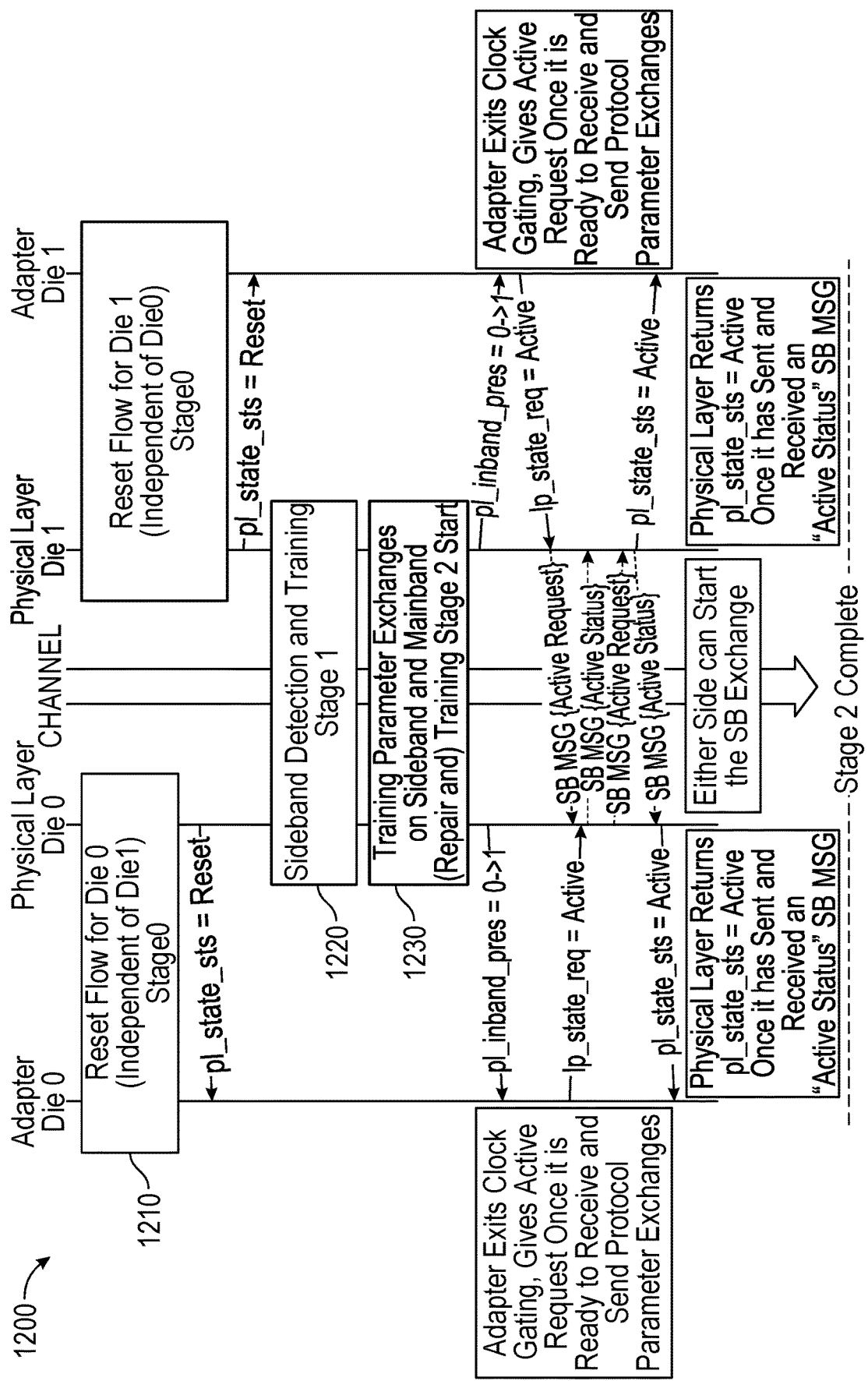
FIG. 12 is a timing diagram illustrating a bring up flow including an RDI bring up flow in accordance with an embodiment.

Referring now to FIG. 12, shown is a timing diagram illustrating a bring up flow including an RDI bring up flow in accordance with an embodiment. As illustrated in FIG. 12, blocks 1210, 1220 and 1230 are the same as discussed above in FIG. 7 for blocks 710, 720 and 730. At a start of stage two of an overall bring up process, a physical layer may send an inband presence signal to a D2D adapter to indicate that a main band of the interconnect has completed link training. As shown, this signal may be reflected from the physical layer to the D2D adapter as a pl_inband_pres signal, which transitions from a reset to a set state. Note that the D2D adapter may be in a clock gated state until it observes this signal. After that, the D2D adapter may request for the RDI to move into an active state (by communication of an Ip_state_req_active signal). When sideband messages between the two physical layers are communicated (details of which are discussed below), the physical layer returns a status signal state (namely, pl_state_sts) to an active state to the D2D adapter. At this point, stage two is completed, and further operations of an overall bring up flow may be performed.

As shown in FIG. 12, this example flow for Stage 2 of the Link bring up highlights the transitions on RDI. This stage sequencing on the RDI co-ordinates the state transition from Reset to Active states. In one embodiment, the following flow may occur:

1. Once the Physical Layer has completed link training, it does a pl_clk_req handshake with the Adapter and reflects pl_inband_pres=1 on RDI. Note that the pl_clk_req handshake is not shown in the example flow in FIG. 12.
2. This is the trigger for the Adapter to request Active state by a Ip_wake_req handshake, also not shown in the example flow in FIG. 12.
3. Only after sampling Ip_state_req=Active, the Physical Layer sends the {LinkMgmt.RDI.Req.Active} packet on the sideband to the remote Link partner's Physical Layer.
4. The Physical Layer responds to the {LinkMgmt.RDI.Rsp.Active} sideband message with an {LinkMgmt.RDI.Rsp.Active} message on sideband. The {LinkMgmt.RDI.Rsp.Active} is sent after the Physical Layer has sampled Ip_state_req=Active from its local RDI interface.
5. Once the Physical Layer has sent and received the {LinkMgmt.RDI.Rsp.Active} sideband message, it transitions pl_state_sts to Active state.
6. This opens up the Adapter to transition to Stage 3 of the bring up flow. Steps 3 to 5 are referred to as the "Active Entry handshake" and are done before transition to Active from Reset or Retrain states.

In one or more embodiments, dynamic coarse clock gating may occur in the D2D adapter and physical layer when a status signal (pl_state_sts) is Reset, LinkReset, Disabled, or power management (PM). A handshake mechanism may be used so that a D2D adapter can request removal of clock gating of the physical layer by asserting Ip_wake_req (asynchronous to Iclk availability in the physical layer). The physical layer responds with a pl_wake_ack (synchronous to Iclk). The Wake Req/Ack is a full handshake for state transition requests (on Ip_state_req or Ip_linkerror) when moving away from Reset or PM states, and may also be used for sending packets on the sideband interface.

PM entry (e.g., a so-called L1 or L2 state, where L2 is a deeper low power state than L1), exit and abort flows may occur using handshakes on the RDI interface. Operation for L1 and L2 may be the same, except that exit from L2 is to Reset state, whereas exit from L1 is to Retrain state. The term "PM" may be used to denote L1 or L2. In an embodiment, a "PM request" sideband message is {LinkMgmt.RDI.Req.L1} or {LinkMgmt.RDI.Req.L2}, and a "PM response" sideband message is {LinkMgmt.RDI.Rsp.L1} or {LinkMgmt.RDI.Rsp.L2}.

Regardless of protocol, the PM entry or exit flow is symmetric on RDI. Both physical layers issue a PM entry request through a sideband message once the conditions of PM entry have been satisfied. PM entry is considered successful and complete once both sides have received a valid "PM Response" sideband message. Once the RDI status is PM, the physical layer can transition itself to a power savings state (turning off the PLL for example). Note that the sideband logic and corresponding PLL stays on even during L1 state. Adapter link state machines (Adapter LSMs) in the Adapter may move to the corresponding PM state before the Adapter requests PM entry from the remote link partner. Adapter LSM in PM implies the retry buffer of the Adapter is empty, and it does not have any new flits (or Ack/Nak) pending to be scheduled, essentially there is no traffic on the main band when PM entry is requested by the Adapter to the physical layer. The Adapter is permitted to clock gate its sideband logic once RDI status is PM and there are no outstanding transactions or responses on the sideband.

A similar bring up flow as discussed above in FIG. 12 may be used for bringing up an FDI. In this case also, an active transition negotiation may occur with a remote link partner using sideband communications. Since the sideband runs slower than the main band, both devices may ensure that receivers are ready before this active state transition. There may be separate handshakes to ensure that receivers of protocol layers on both sides are ready before this active state transition, and before opening up transmitters.

Figure 13:
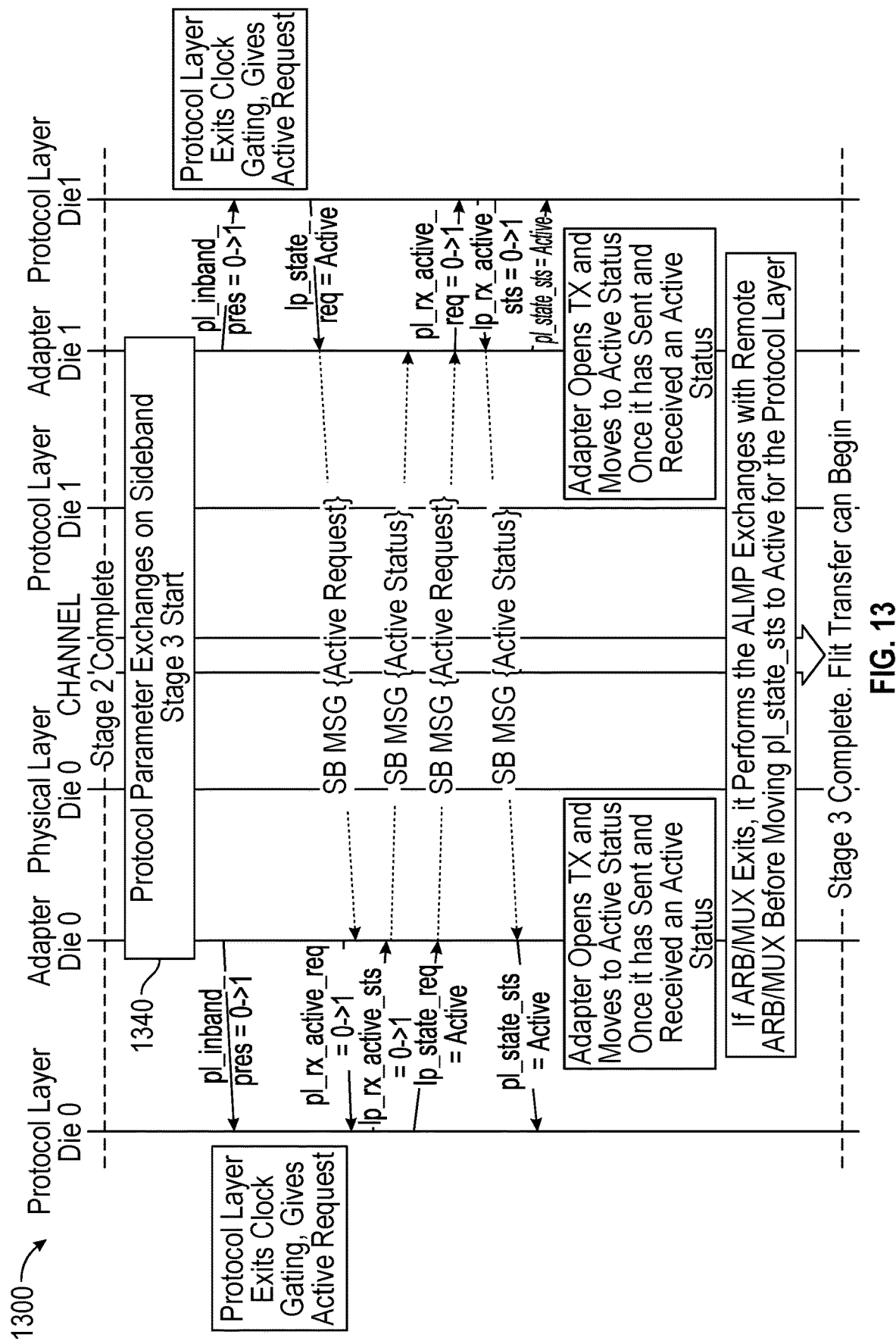
FIG. 13 is a timing diagram illustrating a bring up flow including an FDI bring up flow in accordance with an embodiment.

Referring now to FIG. 13, shown is a timing diagram illustrating a bring up flow including an FDI bring up flow in accordance with an embodiment. Shown here is a similar flow as in FIG. 12 for RDI bring up. However for the FDI bring up, communications occur between a corresponding D2D adapter and a protocol layer to indicate that the main band link training has been completed, which causes the protocol layer to exit a clock gating state (if present). Thereafter, the protocol layer may request entry into the active state and sideband communications occur between the D2D adapters of both dies as shown. Upon completion of these messages, the D2D adapter opens its transmitters and moves to an active status. Thereafter, if there are ARBs/MUXes present, an ARB/MUX link management packet (ALMP) exchange may occur before moving to the active state for the protocol layer. At this point, all bring up flows are completed and normal flit transfers may begin.

FIG. 13 shows an example flow for Stage 3 of the link bring up highlighting the transitions on FDI. This stage sequencing on FDI co-ordinates the state transition from Reset to Active. If multiple stacks of protocol or ARB/MUX is present, the same sequence happens independently for each protocol layer stack. The flows on FDI are illustrated for Adapter 0 link state machine (LSM) in the sideband message encodings, however Adapter 1 LSM sends the sideband message encodings corresponding to Adapter 1 to its remote link partner. The flow may be as follows in one embodiment:

7. Once the Adapter has completed transition to Active on the RDI and successful parameter negotiation with the remote link partner, it does a pl_clk_req handshake with the Protocol Layer and reflects pl_inband_pres=1 on FDI. Note that the pl_clk_req handshake is not shown in the example flow in FIG. 13.
8. This is the trigger for Protocol Layer to request Active state. It is permitted for the Protocol Layer to wait unlit pl_protocol_vld=1 before requesting Active state. It performs the Ip_wake_req handshake, also not shown in the example flow in FIG. 13.
9. On sampling Ip_state_req=Active, the Adapter sends the {LinkMgmt.Adapter0.Req.Active} message on the sideband to the remote link partner.
10. The Adapter responds to the {LinkMgmt.Adapter. Req.Active} sideband message with a {LinkMgmt. Adapter.Rsp.Active} message on the sideband after making sure that the Protocol Layer's Receiver is ready. The {LinkMgmt.Adapter0.Rsp.Active} is only sent after the Adapter has sampled pl_rx_active_req=lp_rx_active_sts=1. As mentioned previously, the pl_clk_req handshake applies to pl_rx_active_req as well; the Adapter can keep pl_clk_req asserted continuously (once it has been asserted for pl_inband_pres) while doing the bring up flow.
11. If no ARB/MUX is present, once the Adapter has sent and received the {LinkMgmt.Adapter0.Rsp.Active} sideband message, it transitions pl_state_sts to Active for the Protocol Layer, and Flit transfer can begin.
12. If ARB/MUX is present, the sending and receipt of {LinkMgmt.Adapter0.Rsp.Active} sideband message opens up the ARB/MUX to perform ALMP exchanges over mainband and eventually transition virtual LSMs to Active state. Steps 3 to 6 constitute the "Active Entry Handshake" on FDI and is performed for every entry to Active state.

Sequencing for PM entry and exit may also be performed on the FDI, which may occur for L1 or L2 entry, although L1 exit transitions the state machine through Retrain to Active, whereas L2 exit transitions the state machine through Reset to Active. The following flow illustrations use L1 as an example. A "PM request" sideband message is {LinkMgmt.Adapter*.Req.L1} or {LinkMgmt. Adapter*.Req.L2}, and a "PM response" sideband message is {LinkMgmt.Adapter*.Rsp.L1} or {LinkMgmt. Adapter*.Rsp.L2}. The flows on FDI are illustrated for Adapter 0 LSM in the sideband message encodings, however Adapter 1 LSM sends the sideband message encodings corresponding to Adapter 1 to its remote Link partner.

The protocol layer may request PM entry on the FDI after idle time criteria have been met. For PCIe and CXL.io protocols, PM DLLPs are not used to negotiate PM entry/exit when using the D2D Adapter's retry buffer (such as for UCIe flit mode). If operating in UCIe flit mode, and an ARB/MUX is present within the D2D Adapter, it follows the rules of a CXL specification (for 256B Flit Mode) to take the vLSMs to the corresponding PM state. Note that even for CXL 1.1, CXL 2.0, 68B-enhanced flit mode, the same ALMP rules as 256B flit mode are used. Once vLSMs are in the PM state, the ARB/MUX requests the Adapter LSM to enter the corresponding PM state, and the Adapter LSM transitions to PM. If a CXL or PCIe protocol has been negotiated, only the upstream port (UP) can initiate PM entry using a sideband message from the UP Adapter to the downstream port (DP) Adapter. PM entry may be considered successful and complete once the UP receives a valid "PM Response" sideband message.

Dynamic coarse clock gating may occur in the Adapter and protocol layer when pl_state_sts is Reset, LinkReset, Disabled or PM states. Note that clock gating is not permitted in LinkError states as it is expected that the UCIe usages enable error handlers to make sure the link is not stuck in a LinkError state, if the intent is to save power when a link is in an error state.

A protocol layer can request removal of clock gating of the Adapter by asserting Ip_wake_req (asynchronous to Iclk availability in the Adapter). The Adapter responds with a pl_wake_ack (synchronous to Iclk). The extent of internal clock ungating when pl_wake_ack is asserted is implementation-specific, but Iclk is available by this time to enable FDI interface transitions from the protocol layers. The Wake Req/Ack is a full handshake and is used for state transition requests (on Ip_state_req or Ip_linkerror) when moving away from Reset or PM states, and/or for sending packets on the sideband interface.

Note that in various embodiments, one or more of the features described herein may be configurable to be enabled or disabled, e.g., under dynamic user control, based on information stored in one or more configuration registers (which may be present in one or more of D2D adapter or physical layer, for example). In addition to dynamic (or boot time) enabling or disabling of various features, it is also possible to provide configurability as to operational parameters of certain aspects of UCIe communications.

Embodiments may support two broad usage models. The first is package level integration to deliver power-efficient and cost-effective performance. Components attached at the board level such as memory, accelerators, networking devices, modem, etc. can be integrated at the package level with applicability from hand-held to high-end servers. In such use cases dies from potentially multiple sources may be connected through different packaging options, even on the same package.

The second usage is to provide off-package connectivity using different type of media (e.g., optical, electrical cable, millimeter wave) using UCIe retimers to transport the underlying protocols (e.g., PCIe, CXL) at the rack or pod level for enabling resource pooling, resource sharing, and/or message passing using load-store semantics beyond the node level to the rack/pod level to derive better power-efficient and cost-effective performance at the edge and data centers.

Figure 14:
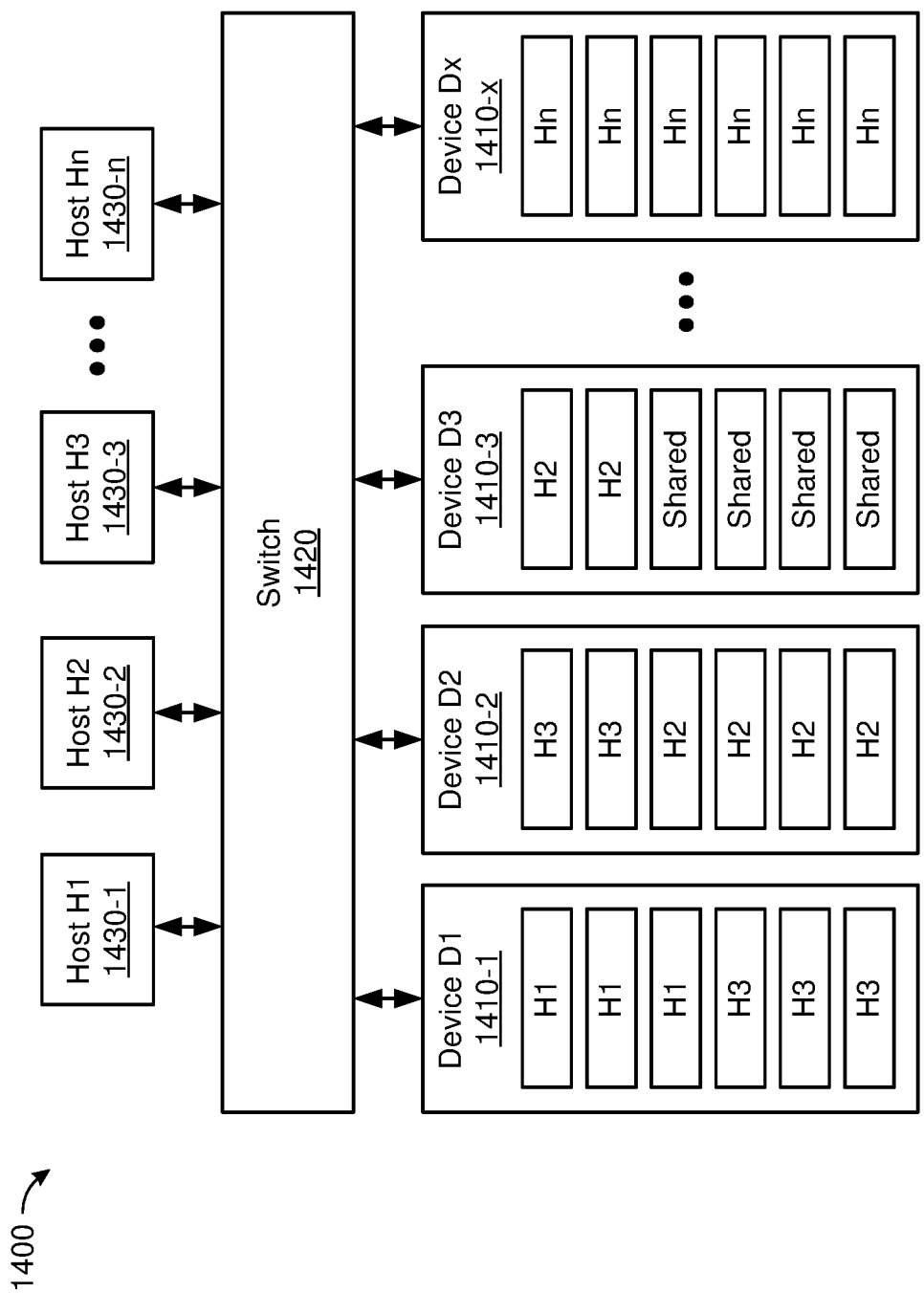
FIG. 14 is a block diagram of another example system in accordance with an embodiment.

As discussed above, embodiments may be implemented in datacenter use cases, such as in connection with racks or pods. As an example, multiple compute nodes from different compute chassis may connect to a CXL switch. In turn, the CXL switch may connect to multiple CXL accelerators/Type-3 memory devices, which can be placed in one or more separate drawers Referring now to FIG. 14, shown is a block diagram of another example system in accordance with an embodiment. In FIG. 14, system 1400 may be all or part of a rack-based server having multiple hosts in the form of compute drawers that may couple to pooled memory via one or more switches.

As shown, multiple hosts 1430-1-$n$ (also referred to herein as "hosts 1430") are present. Each host may be implemented as a compute drawer having one or more SoCs, memory, storage, interface circuitry and so forth. In one or more embodiments, each host 1430 may include one or more virtual hierarchies corresponding to different cache coherence domains. Hosts 1430 may couple to a switch 1420, which may be implemented as a UCIe or CXL switch (e.g., a CXL 2.0 (or later) switch). In an embodiment, each host 1430 may couple to switch 1420 using an off-package interconnect, e.g., a UCIe interconnect running a CXL protocol through at least one UCIe retimer (which may be present in one or both of hosts 1430 and switch 1420).

Switch 1420 may couple to multiple devices 1410-1-$x$ (also referred to herein as "device 1410"), each of which may be a memory device (e.g., a Type 3 CXL memory expansion device) and/or an accelerator. In the illustration of FIG. 14, each device 1410 is shown as Type 3 memory device having any number of memory regions (e.g., defined partitions, memory ranges, etc.). Depending on configuration and use case, certain devices 1410 may include memory regions assigned to particular hosts while others may include at least some memory regions designated as shared memory. Although embodiments are not limited in this regard, the memory included in devices 1410 may be implemented with any type(s) of computer memory (e.g., dynamic random-access memory (DRAM), static random-access memory (SRAM), non-volatile memory (NVM), a combination of DRAM and NVM, etc.).

Figure 15:
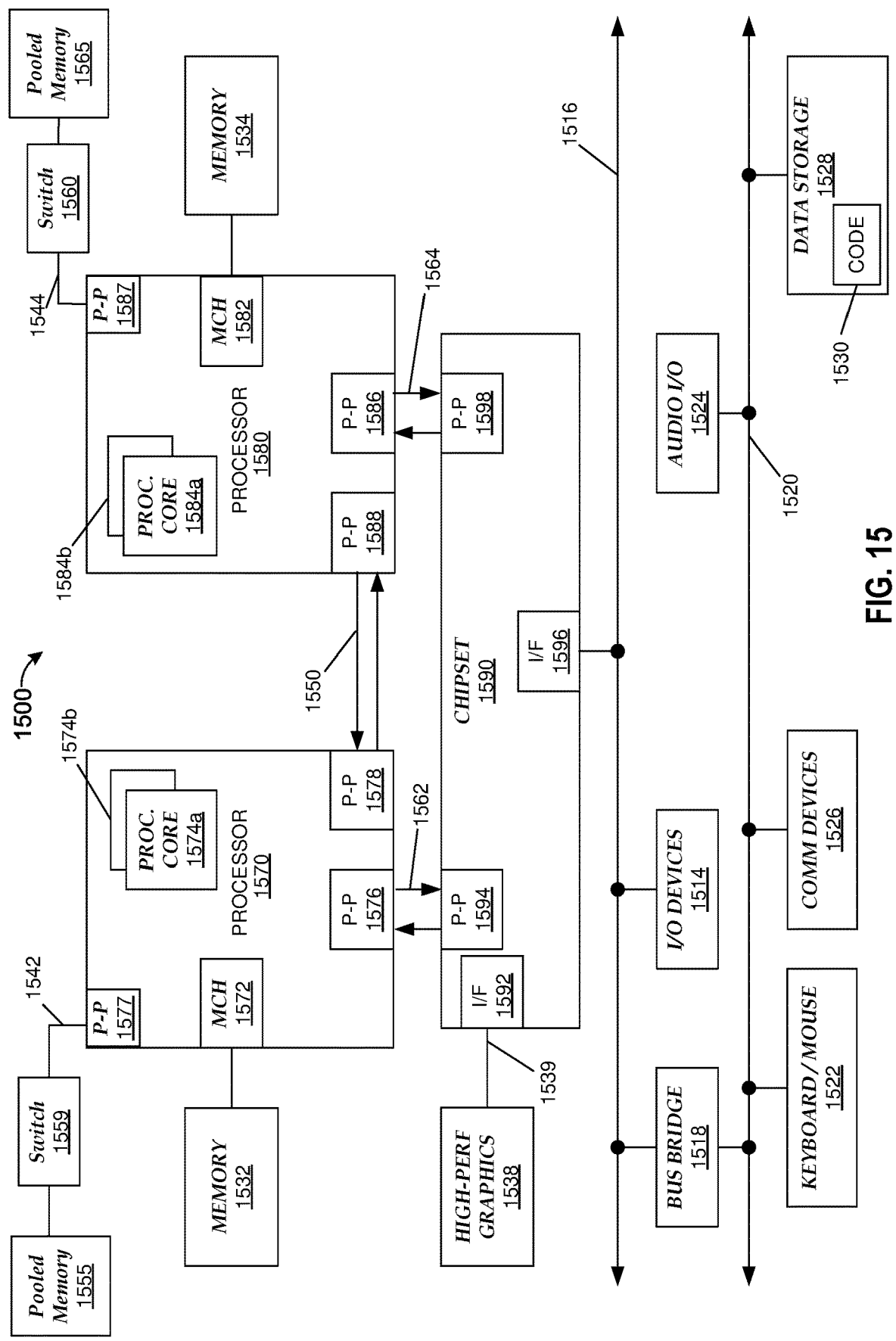
FIG. 15 is a block diagram of a system in accordance with another embodiment such as an edge platform.

Referring now to FIG. 15, shown is a block diagram of a system in accordance with another embodiment such as an edge platform. As shown in FIG. 15, multiprocessor system 1500 includes a first processor 1570 and a second processor 1580 coupled via an interconnect 1550, which can be a UCIe interconnect in accordance with an embodiment running a coherency protocol. As shown in FIG. 15, each of processors 1570 and 1580 may be many core processors including representative first and second processor cores (i.e., processor cores 1574$a$ and 1574$b$ and processor cores 1584$a$ and 1584$b$).

In the embodiment of FIG. 15, processors 1570 and 1580 further include point-to point interconnects 1577 and 1587, which couple via interconnects 1542 and 1544 (which may be UCIe links in accordance with an embodiment) to switches 1559 and 1560. In turn, switches 1559, 1560 couple to pooled memories 1555 and 1565 (e.g., via UCIe links).

Still referring to FIG. 15, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 15, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1576 and 1586, respectively. As shown in FIG. 15, chipset 1590 includes P-P interfaces 1594 and 1598.

Furthermore, chipset 1590 includes an interface 1592 to couple chipset 1590 with a high performance graphics engine 1538, by a P-P interconnect 1539. As shown in FIG. 15, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530, in one embodiment. Further, an audio I/O 1524 may be coupled to second bus 1520.

Figure 16:
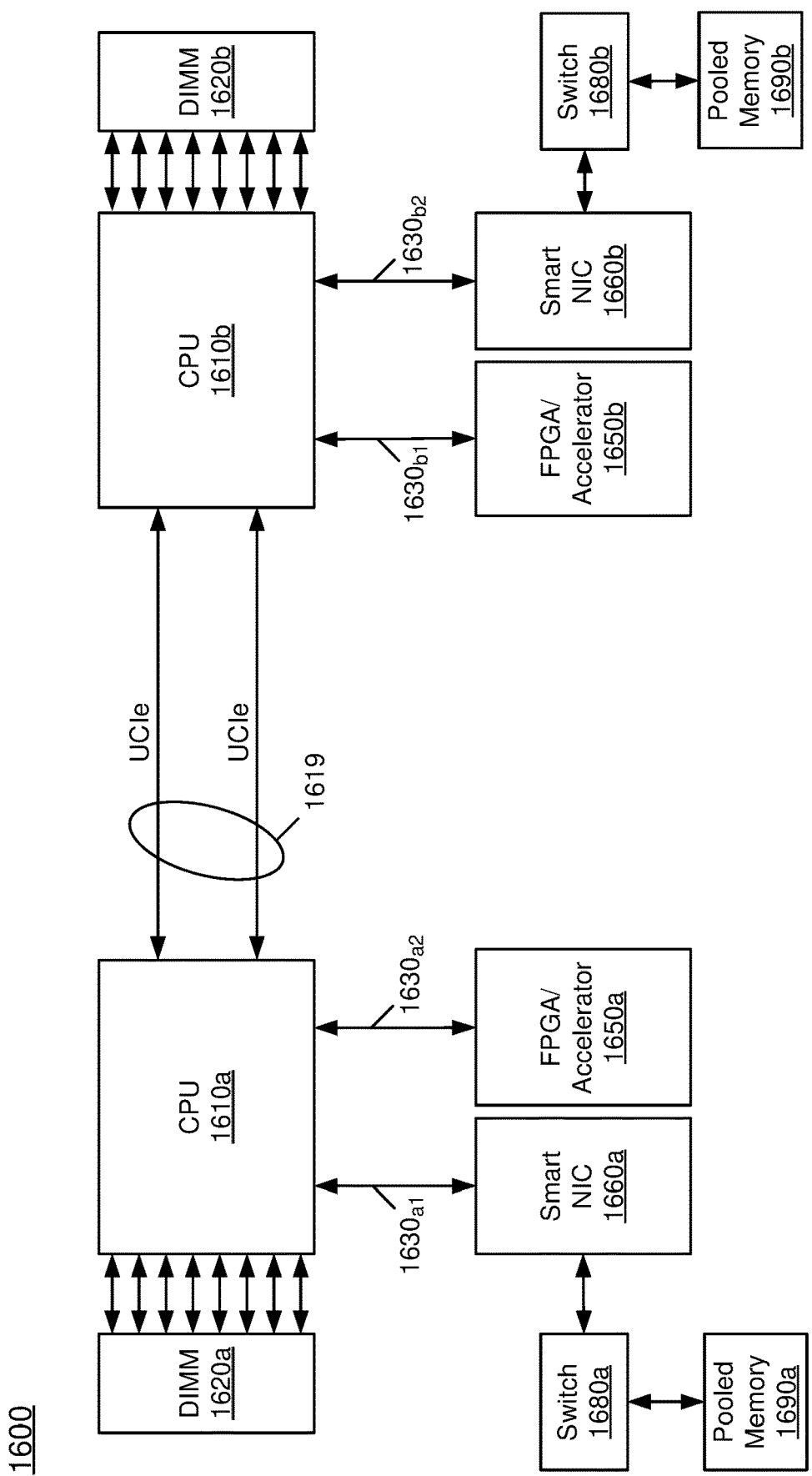
FIG. 16 is a block diagram of a system in accordance with another embodiment.

Referring now to FIG. 16, shown is a block diagram of a system 1600 in accordance with another embodiment. As shown in FIG. 16, system 1600 may be any type of computing device, and in one embodiment may be a server system. In the embodiment of FIG. 16, system 1600 includes multiple CPUs 1610$a,b$ that in turn couple to respective system memories 1620$a,b$ which in embodiments may be implemented as DIMMs such as double data rate (DDR) memory, persistent or other types of memory. Note that CPUs 1610 may couple together via an interconnect system 1615 such as an UCIe or other interconnect implementing a coherency protocol.

To enable coherent accelerator devices and/or smart adapter devices to couple to CPUs 1610 by way of potentially multiple communication protocols, a plurality of interconnects 1630$_{a1-b2}$ may be present. Each interconnect 1630 may be a given instance of a UCIe link in accordance with an embodiment.

In the embodiment shown, respective CPUs 1610 couple to corresponding field programmable gate arrays (FPGAs)/accelerator devices 1650$a,b$ (which may include GPUs, in one embodiment). In addition CPUs 1610 also couple to smart NIC devices 1660$a,b$. In turn, smart NIC devices 1660$a,b$ couple to switches 1680$a,b$ (e.g., CXL switches in accordance with an embodiment) that in turn couple to a pooled memory 1690$a,b$ such as a persistent memory. In embodiments, various components shown in FIG. 16 may implement circuitry to perform techniques as described herein.

The following examples pertain to further embodiments.

In one example, an apparatus comprises a first die comprising: a first die-to-die adapter to communicate with first protocol layer circuitry via a FDI and first physical layer circuitry via a RDI, where the first die-to-die adapter is to receive message information, the message information comprising first information of a first interconnect protocol; and the first physical layer circuitry coupled to the first die-to-die adapter, where the first physical layer circuitry is to receive and output the first information to a second die via an interconnect, the first physical layer circuitry comprising a plurality of modules, each of the plurality of modules comprising an analog front end having transmitter circuitry and receiver circuitry.

In an example, the first die-to-die adapter is to host a plurality of protocol layer circuitries, where the first die-to-die adapter is to couple with the first protocol layer circuitry via a first FDI and couple with second protocol layer circuitry via a second FDI.

In an example, the first die-to-die adapter is to maintain a first independent state machine for the first protocol layer circuitry and a second independent state machine for the second protocol layer circuitry.

In an example, the first die-to-die adapter further comprises a stack multiplexer, where the stack multiplexer is to receive first information from the first protocol layer circuitry and receive second information from the second protocol layer circuitry and to pass at least one of the first information or the second information to the first physical layer circuitry via the RDI.

In an example, the apparatus further comprises a plurality of arbiters/multiplexers, the plurality of arbiters/multiplexers coupled to the stack multiplexer.

In an example, the first die-to-die adapter further comprises an arbiter/multiplexer to receive CXL.mem information of a second interconnect protocol and CXL.i/o information of the second interconnect protocol.

In an example, the first die-to-die adapter is to send to the first physical layer circuitry at least one of CRC information or parity information staggered with respect to data associated with the CRC information or the parity information.

In an example, the first physical layer circuitry is to send an inband presence state signal having a reset state after a reset of the first die and prior to sideband training.

In an example, after the sideband training and mainband training, the first physical layer circuitry is to send the inband presence state signal having a set state.

In an example, the first die-to-die adapter is to be in a clock gated state until receipt of the inband presence state signal having the set state.

In an example, the interconnect comprises a multi-protocol capable interconnect having a UCIe architecture, the first interconnect protocol comprising a flit mode of a PCIe protocol and the interconnect further to communicate second information of a second interconnect protocol, the second interconnect protocol comprising a flit mode of a CXL protocol.

In another example, a method comprises: performing, via physical layer circuitry of a first die, a link training of a mainband of an interconnect coupling the first die with a second die, the interconnect comprising the mainband and a sideband; after performing the link training, sending a first signal having a set state to a die-to die adapter of the first die coupled to the physical layer circuitry via a RDI, the first signal having the set state to indicate completion of the link training; performing a wake request handshake with the die-to-die adapter via the RDI; and after the wake request handshake, sending a first sideband message to the second die via the sideband to indicate that the die-to-die adapter is in an active state.

In an example, the method further comprises performing a first request handshake with the die-to-die adapter to request removal of clock gating.

In an example, the method further comprises: receiving a second sideband message from the second die via the sideband, the second sideband message to indicate that a die-to-die adapter of the second die is in an active state; and sending a third sideband message to the second die via the sideband, the third sideband message to acknowledge the second sideband message.

In an example, the method further comprises performing a symmetric power management flow between the physical layer circuitry and second physical layer circuitry of the second die, and thereafter transitioning the physical layer circuitry to a power savings state.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another example, a package comprises a first die and a second die coupled to the first die via an interconnect. The first die comprises a CPU and a protocol stack comprising: a die-to-die adapter to communicate with protocol layer circuitry via a FDI and physical layer circuitry via a RDI, where the die-to-die adapter is to communicate message information, the message information comprising first information of a first interconnect protocol; and the physical layer circuitry coupled to the die-to-die adapter via the RDI, where the physical layer circuitry is to receive and output the first information to a second die via an interconnect comprising a mainband and a sideband; where the die-to-die adapter is to: send a first signal having a set state to the protocol layer circuitry via the FDI to indicate completion of link training of the interconnect; perform a wake request handshake with the protocol layer circuitry via the FDI; and after the wake request handshake, send a first sideband message to the second die via the sideband to indicate that the protocol layer circuitry is in an active state.

In an example, the die-to-die adapter, in response to an adapter active request sideband message from the second die, is to ensure that a receiver of the protocol layer circuitry is in an active state and then send an adapter active response sideband message to the second die.

In an example, the physical layer circuitry is to perform a sideband initialization of the sideband after a reset flow for the first die that is independent of a reset flow for the second die.

In an example, the package further comprises a package substrate comprising the interconnect, the interconnect comprising an on-package interconnect to couple the first die and the second die.

In an example, the second die comprises an accelerator, where the first die is to communicate with the second die according to at least one of a flit mode of a PCIe protocol or a flit mode of a CXL protocol.

In another example, an apparatus comprises: means for performing a link training of a mainband of an interconnect means coupling a first die means with a second die means, the interconnect means comprising the mainband and a sideband; means for sending a first signal having a set state to a die-to die adapter means of the first die means coupled to physical layer means via a RDI means, the first signal having the set state to indicate completion of the link training; means for performing a wake request handshake with the die-to-die adapter means via the RDI means; and means for sending a first sideband message to the second die means via the sideband to indicate that the die-to-die adapter means is in an active state.

In an example, the apparatus further comprises means for performing a first request handshake with the die-to-die adapter means to request removal of clock gating.

In an example, the apparatus further comprises: means for receiving a second sideband message from the second die means via the sideband, the second sideband message to indicate that a die-to-die adapter means of the second die means is in an active state; and means for sending a third sideband message to the second die means via the sideband, the third sideband message to acknowledge the second sideband message.

In an example, the apparatus further comprises means for performing a symmetric power management flow between the physical layer means and second physical layer means of the second die means, and means for transitioning the physical layer means to a power savings state.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SOC or other processor, is to configure the SOC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
   a first die comprising:
   a first die-to-die adapter to communicate with first protocol layer circuitry via a flit-aware die-to-die interface (FDI) and first physical layer circuitry via a raw die-to-die interface (RDI), wherein the first die-to-die adapter is to receive message information, the message information comprising first information of a first interconnect protocol; and
   the first physical layer circuitry coupled to the first die-to-die adapter, wherein the first physical layer circuitry is to receive and output the first information to a second die via an interconnect, the first physical layer circuitry comprising a plurality of modules, each of the plurality of modules comprising an analog front end having transmitter circuitry and receiver circuitry;
   wherein the interconnect comprises a mainband and a sideband;
   wherein the first die-to-die adapter is to send a first signal having a set state to the first protocol layer circuitry via the FDI to indicate completion of link training of the interconnect;
   wherein the first die-to-die adapter is to perform a wake request handshake with the first protocol layer circuitry via the FDI; and
   wherein after the wake request handshake, the first die-to-die adapter is to send a first sideband message to the second die via the sideband to indicate that the first protocol layer circuitry is in an active state.

2. The apparatus of claim 1, wherein the first die-to-die adapter is to host a plurality of protocol layer circuitries, wherein the first die-to-die adapter is to couple with the first protocol layer circuitry via a first FDI and couple with second protocol layer circuitry via a second FDI.

3. The apparatus of claim 2, wherein the first die-to-die adapter is to maintain a first independent state machine for the first protocol layer circuitry and a second independent state machine for the second protocol layer circuitry.

4. The apparatus of claim 2, wherein the first die-to-die adapter further comprises a stack multiplexer, wherein the stack multiplexer is to receive the first information from the first protocol layer circuitry and receive second information from the second protocol layer circuitry and to pass at least one of the first information or the second information to the first physical layer circuitry via the RDI.

5. The apparatus of claim 4, further comprising a plurality of arbiters/multiplexers, the plurality of arbiters/multiplexers coupled to the stack multiplexer.

6. The apparatus of claim 4, wherein the first die-to-die adapter further comprises an arbiter/multiplexer to receive Compute Express Link (CXL) memory (CXL.mem) information of a second interconnect protocol and CXL input/output (CXL.i/o) information of the second interconnect protocol.

7. The apparatus of claim 1, wherein the first die-to-die adapter is to send to the first physical layer circuitry at least one of cyclic redundancy checksum (CRC) information or parity information staggered with respect to data associated with the CRC information or the parity information.

8. The apparatus of claim 1, wherein the first physical layer circuitry is to send an inband presence state signal having a reset state after a reset of the first die and prior to sideband training.

9. The apparatus of claim 8, wherein after the sideband training and mainband training, the first physical layer circuitry is to send the inband presence state signal having a set state.

10. The apparatus of claim 9, wherein the first die-to-die adapter is to be in a clock gated state until receipt of the inband presence state signal having the set state.

11. The apparatus of claim 1, wherein the interconnect comprises a multi-protocol capable interconnect having a Universal Chiplet Interconnect express (UCIe) architecture, the first interconnect protocol comprising a flit mode of a Peripheral Component Interconnect express (PCIe) protocol and the interconnect further to communicate second information of a second interconnect protocol, the second interconnect protocol comprising a flit mode of a Compute Express Link (CXL) protocol.

12. A method comprising:
performing, via physical layer circuitry of a first die, a link training of a mainband of an interconnect coupling the first die with a second die, the interconnect comprising the mainband and a sideband;
after performing the link training, sending a first signal having a set state to a die-to die adapter of the first die coupled to the physical layer circuitry via a raw die-to-die interface (RDI), the first signal having the set state to indicate completion of the link training;
performing a wake request handshake with the die-to-die adapter via the RDI; and
after the wake request handshake, sending a first sideband message to the second die via the sideband to indicate that the die-to-die adapter is in an active state.

13. The method of claim 12, further comprising performing a first request handshake with the die-to-die adapter to request removal of clock gating.

14. The method of claim 12, further comprising:
receiving a second sideband message from the second die via the sideband, the second sideband message to indicate that a die-to-die adapter of the second die is in an active state; and
sending a third sideband message to the second die via the sideband, the third sideband message to acknowledge the second sideband message.

15. The method of claim 12, further comprising performing a symmetric power management flow between the physical layer circuitry and second physical layer circuitry of the second die, and thereafter transitioning the physical layer circuitry to a power savings state.

16. A package comprising:
a first die comprising a central processing unit (CPU) and a protocol stack comprising:
a die-to-die adapter to communicate with protocol layer circuitry via a flit-aware die-to-die interface (FDI) and physical layer circuitry via a raw die-to-die interface (RDI), wherein the die-to-die adapter is to communicate message information, the message information comprising first information of a first interconnect protocol; and
the physical layer circuitry coupled to the die-to-die adapter via the RDI, wherein the physical layer circuitry is to receive and output the first information to a second die via an interconnect comprising a mainband and a sideband;
wherein the die-to-die adapter is to:
send a first signal having a set state to the protocol layer circuitry via the FDI to indicate completion of link training of the interconnect;
perform a wake request handshake with the protocol layer circuitry via the FDI; and
after the wake request handshake, send a first sideband message to the second die via the sideband to indicate that the protocol layer circuitry is in an active state; and the second die coupled to the first die via the interconnect.

17. The package of claim 16, wherein the die-to-die adapter, in response to an adapter active request sideband message from the second die, is to ensure that a receiver of the protocol layer circuitry is in an active state and then send an adapter active response sideband message to the second die.

18. The package of claim 16, wherein the physical layer circuitry is to perform a sideband initialization of the sideband after a reset flow for the first die that is independent of a reset flow for the second die.

19. The package of claim 16, further comprising a package substrate, the package substrate comprising the interconnect, the interconnect comprising an on-package interconnect to couple the first die and the second die.

20. The package of claim 16, wherein the second die comprises an accelerator, wherein the first die is to communicate with the second die according to at least one of a flit mode of a Peripheral Component Interconnect express (PCIe) protocol or a flit mode of a Compute Express Link (CXL) protocol.

* * * * *